US012762970B2

(12) United States Patent
George et al.

(10) Patent No.: US 12,762,970 B2
(45) Date of Patent: *Oct. 13, 2026

(54) SYSTEM AND/OR METHOD FOR DIRECTED AIRCRAFT PERCEPTION

(71) Applicant: Merlin Labs, Inc., Boston, MA (US)

(72) Inventors: Matthew George, Boston, MA (US); Alexander Naiman, Boston, MA (US); Michael Pust, Boston, MA (US); Joseph Bondaryk, Boston, MA (US)

(73) Assignee: Merlin Labs, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/960,307

(22) Filed: Nov. 26, 2024

(65) Prior Publication Data

US 2025/0087105 A1 Mar. 13, 2025

Related U.S. Application Data

(63) Continuation of application No. 18/515,836, filed on Nov. 21, 2023, now Pat. No. 12,183,214, which is a (Continued)

(51) Int. Cl.
*G08G 5/80* (2025.01)
*G08G 5/26* (2025.01)
(Continued)

(52) U.S. Cl.
CPC ................. *G08G 5/80* (2025.01); *G08G 5/26* (2025.01); *G08G 5/723* (2025.01); *G10L 15/26* (2013.01)

(58) Field of Classification Search
CPC ............ G08G 5/80; G08G 5/26; G08G 5/723; G08G 5/51; G08G 5/727; G08G 5/21; G08G 5/22; G10L 15/26; G10L 15/22
See application file for complete search history.

(56) References Cited

U.S. PATENT DOCUMENTS 5,652,897 A 7/1997 Linebarger et al.
5,926,790 A 7/1999 Wright
(Continued)

FOREIGN PATENT DOCUMENTS

CN 107315737 A 11/2017
EP 1465136 A1 10/2004
EP 3855428 A1 7/2021

OTHER PUBLICATIONS

Chen, David L., et al., "Learning to Interpret Natural Language Navigation Instructions from Observations", Association for the Advancement of Artificial Intelligence, 2011.
(Continued)

*Primary Examiner* — Dylan M Katz
(74) *Attorney, Agent, or Firm* — Jeffrey Schox; Evan Myers

(57) ABSTRACT

The method can include performing inference using the system; and can optionally include training the system components. The method functions to automatically interpret flight commands from a stream of air traffic control (ATC) radio communications. The method can additionally or alternatively function to train and/or update a natural language processing system based on ATC communications. Additionally, the method can include or be used in conjunction with collision avoidance and/or directed perception for traffic detection associated therewith.

21 Claims, 21 Drawing Sheets

Related U.S. Application Data continuation of application No. 18/126,299, filed on Mar. 24, 2023, now Pat. No. 11,862,031.

(51) Int. Cl.
*G08G 5/72* (2025.01)
*G10L 15/26* (2006.01)

(56) References Cited

U.S. PATENT DOCUMENTS

| | | | |
|---|---|---|---|
| 6,144,938 | A | 11/2000 | Surace et al. |
| 6,175,314 | B1 | 1/2001 | Cobley |
| 6,230,131 | B1 | 5/2001 | Kuhn et al. |
| 6,346,892 | B1 | 2/2002 | Demers et al. |
| 7,228,275 | B1 | 6/2007 | Endo et al. |
| 8,793,139 | B1 | 7/2014 | Serban et al. |
| 9,536,522 | B1 | 1/2017 | Hall et al. |
| 9,830,910 | B1 | 11/2017 | Shapiro et al. |
| 9,886,862 | B1 | 2/2018 | Burgess et al. |
| 10,515,625 | B1 | 12/2019 | Metallinou et al. |
| 10,535,351 | B2 | 1/2020 | Gaston et al. |
| 10,743,107 | B1 | 8/2020 | Yoshioka et al. |
| 10,832,668 | B1 | 11/2020 | Devries et al. |
| 10,847,147 | B2 | 11/2020 | Gurunath Kulkarni et al. |
| 10,896,295 | B1 | 1/2021 | Shenoy |
| 10,984,660 | B2 | 4/2021 | Hegranes et al. |
| 11,182,828 | B2 | 11/2021 | Dey et al. |
| 11,289,094 | B2 | 3/2022 | Baladhandapani et al. |
| 11,393,349 | B2 | 7/2022 | Mier et al. |
| 11,423,887 | B2 | 8/2022 | Pust et al. |
| 11,521,616 | B2 | 12/2022 | Pust et al. |
| 11,787,062 | B2 | 10/2023 | Klemisch |
| 11,862,031 | B1 * | 1/2024 | George .................. G10L 15/26 |
| 12,183,214 | B2 * | 12/2024 | George .................. G08G 5/723 |
| 2004/0225650 | A1 | 11/2004 | Cooper et al. |
| 2005/0033582 | A1 | 2/2005 | Gadd et al. |
| 2005/0131646 | A1 | 6/2005 | Camus |
| 2007/0288129 | A1 | 12/2007 | Komer et al. |
| 2007/0288242 | A1 | 12/2007 | Spengler et al. |
| 2008/0065275 | A1 | 3/2008 | Vizzini |
| 2009/0258333 | A1 | 10/2009 | Yu |
| 2010/0235167 | A1 | 9/2010 | Bourdon |
| 2011/0093301 | A1 | 4/2011 | Walker |
| 2011/0125503 | A1 | 5/2011 | Dong et al. |
| 2011/0282522 | A1 | 11/2011 | Prus et al. |
| 2012/0010887 | A1 | 1/2012 | Boregowda et al. |
| 2012/0016678 | A1 | 1/2012 | Gruber et al. |
| 2015/0097706 | A1 | 4/2015 | Perger et al. |
| 2015/0100311 | A1 | 4/2015 | Kar et al. |
| 2016/0093302 | A1 | 3/2016 | Bilek et al. |
| 2016/0093304 | A1 | 3/2016 | Kim et al. |
| 2016/0125873 | A1 | 5/2016 | Braho et al. |
| 2016/0161946 | A1 | 6/2016 | Wuth Sepulveda et al. |
| 2016/0284220 | A1 * | 9/2016 | Kar .......................... G08G 5/21 |
| 2016/0297543 | A1 | 10/2016 | Li et al. |
| 2016/0372117 | A1 | 12/2016 | Klose et al. |
| 2017/0069136 | A1 | 3/2017 | Sharma |
| 2017/0113684 | A1 | 4/2017 | Banvait et al. |
| 2017/0324437 | A1 | 11/2017 | Ruttler et al. |
| 2018/0012135 | A1 | 1/2018 | Chakraborty et al. |
| 2018/0061243 | A1 | 3/2018 | Shloosh |
| 2018/0129721 | A1 | 5/2018 | Apple et al. |
| 2018/0182250 | A1 | 6/2018 | Bonnet et al. |
| 2019/0019423 | A1 * | 1/2019 | Choi .................... G05D 1/0088 |
| 2019/0195652 | A1 | 6/2019 | Lafon et al. |
| 2019/0204824 | A1 | 7/2019 | Micros |
| 2019/0265006 | A1 | 8/2019 | Jenzowsky et al. |
| 2019/0310981 | A1 | 10/2019 | Sevenster et al. |
| 2019/0318741 | A1 | 10/2019 | Songa et al. |
| 2019/0341052 | A1 | 11/2019 | Allibhai |
| 2020/0027449 | A1 | 1/2020 | Lafon et al. |
| 2020/0027457 | A1 | 1/2020 | Gelinske et al. |
| 2020/0104362 | A1 | 4/2020 | Yang et al. |
| 2020/0110795 | A1 | 4/2020 | Gupta et al. |
| 2020/0151553 | A1 | 5/2020 | Zhou et al. |
| 2020/0183983 | A1 | 6/2020 | Abe et al. |
| 2020/0202733 | A1 | 6/2020 | Staudinger et al. |
| 2020/0257963 | A1 | 8/2020 | Abhinav et al. |
| 2020/0285996 | A1 | 9/2020 | Janakiraman et al. |
| 2020/0290740 | A1 | 9/2020 | Rangan |
| 2020/0335084 | A1 | 10/2020 | Wang et al. |
| 2020/0365050 | A1 | 11/2020 | Antraygue |
| 2020/0380958 | A1 | 12/2020 | Srinivasan et al. |
| 2021/0012765 | A1 | 1/2021 | Weisz et al. |
| 2021/0020168 | A1 | 1/2021 | Dame et al. |
| 2021/0043095 | A1 | 2/2021 | Venkataraman et al. |
| 2021/0097058 | A1 | 4/2021 | Skiles et al. |
| 2021/0117069 | A1 | 4/2021 | Komer et al. |
| 2021/0183360 | A1 | 6/2021 | Ebrahimifard et al. |
| 2021/0209331 | A1 | 7/2021 | Grant et al. |
| 2021/0295720 | A1 | 9/2021 | Mier et al. |
| 2021/0312927 | A1 | 10/2021 | Baladhandapani et al. |
| 2021/0342634 | A1 | 11/2021 | Chen et al. |
| 2022/0005332 | A1 | 1/2022 | Metzler et al. |
| 2022/0043931 | A1 | 2/2022 | Pierce |
| 2022/0068261 | A1 | 3/2022 | Sharifi et al. |
| 2022/0101127 | A1 | 3/2022 | Torras et al. |
| 2022/0165163 | A1 | 5/2022 | Miller et al. |
| 2022/0194576 | A1 | 6/2022 | Yang et al. |
| 2022/0246150 | A1 | 8/2022 | Pust et al. |
| 2022/0392439 | A1 | 12/2022 | Siohan et al. |
| 2023/0057709 | A1 | 2/2023 | Naiman et al. |

OTHER PUBLICATIONS

Craparo, Emily M., "Natural Language Processing for Unmanned Aerial Vehicle Guidance Interfaces", Submitted to Department of Aeronautics and Astronautics on May 30, 2004, in partial fulfillment of the requirements of the degree of Master of Science in Aeronautics and Astronautics, MIT.

Gupta, Vishwa , et al., "CRIM's Speech Transcription and Call Sign Detection System for the ATC Airbus Challenge Task", Interspeech 2019, Sep. 15-19, 2019, Graz, Austria.

Helmke, Hartmut , "Machine Learning of Air Traffic Controller Command Extraction Models for Speech Recognition Applications", 2020 AIAA/IEEE 39th Digital Avionics Systems Conference (DASC), IEEE, Oct. 11, 2020 (Oct. 11, 2020), pp. 1-9, XP033858707, DOI: 10.1109/DASC50938.2020.9256484 [retrieved on Nov. 1, 2020 O].

Oualil , et al., "A context-aware speech recognition and understanding system for air traffic control domain", 2017 IEEE Automatic Speech Recognition and Understanding Workshop (ASRU), IEEE, Dec. 16, 2017 (Dec. 16, 2017), pp. 404-408, XP033306866, DOI: 10.1109/ASRU.2017.8268964.

Paul, Saptarshi , et al., "NLP Tools Used in Civil Aviation: A Survey", International Journal of Advanced Research in Computer Science, vol. 9, No. 2, Mar.-Apr. 2018.

* cited by examiner

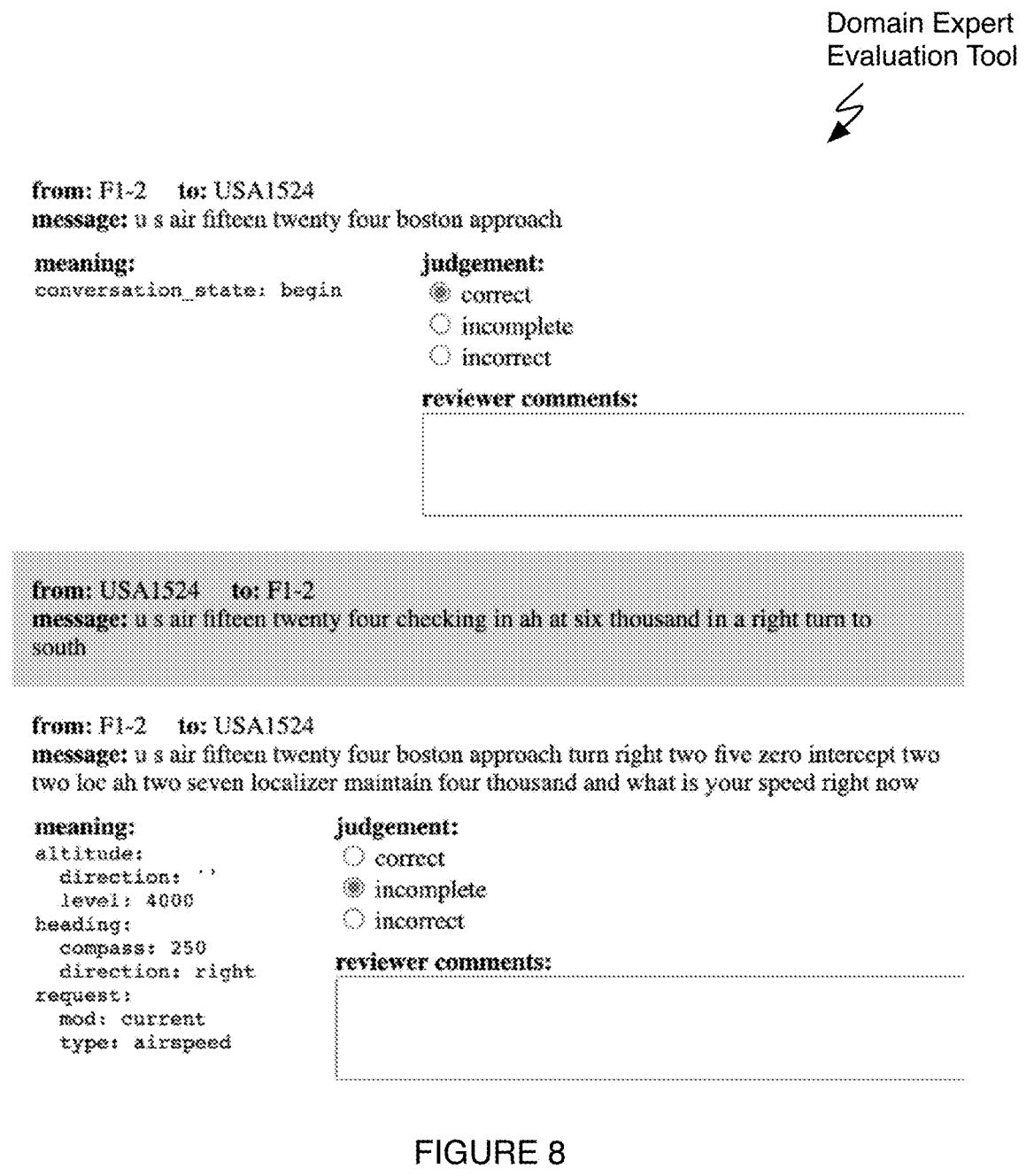

Domain Expert Evaluation Tool from: F1-2 to: USA1524
message: u s air fifteen twenty four boston approach meaning:
```
conversation_state: begin
```

judgement:
- (•) correct
- ( ) incomplete
- ( ) incorrect reviewer comments:

from: USA1524 to: F1-2
message: u s air fifteen twenty four checking in ah at six thousand in a right turn to south from: F1-2 to: USA1524
message: u s air fifteen twenty four boston approach turn right two five zero intercept two two loc ah two seven localizer maintain four thousand and what is your speed right now meaning:
```
altitude:
  direction: ''
  level: 4000
heading:
  compass: 250
  direction: right
request:
  mod: current
  type: airspeed
```

judgement:
- ( ) correct
- (•) incomplete
- ( ) incorrect reviewer comments:

FIGURE 8

SYSTEM AND/OR METHOD FOR DIRECTED AIRCRAFT PERCEPTION

CROSS REFERENCE TO RELATED APPLICATIONS

This application is a continuation of U.S. application Ser. No. 18/515,836, filed 21 Nov. 2023, which is a continuation of U.S. application Ser. No. 18/126,299, filed 24 Mar. 2023, each of which are incorporated herein in their entirety by this reference.

This application related to U.S. application Ser. No. 17/500,358, filed 13 Oct. 2021, which claims the benefit of U.S. Provisional Application No. 63/090,898, filed Oct. 13, 2020, which is incorporated herein in its entirety by this reference.

TECHNICAL FIELD

This invention relates generally to the aviation field, and more specifically to a new and useful perception system and/or method in the aviation field.

BACKGROUND

Aircraft pilots are frequently expected to identify traffic, or confirm a visual on objects, in proximity to their flight-path at the request of Air Traffic Control (ATC). Even with the assistance of ATC, pilots commonly fail to identify nearby traffic (e.g., identification accuracy among pilots, in general, is about 50%), regularly resulting in air traffic being rerouted to avoid collisions. Some aircraft are equipped with ADS-B systems which provide a position estimate for aircrafts in the surrounding airspace. In general aviation, ADS-B position estimates are not relied upon as a source of truth for aircraft positions, as they are sometimes inaccurate (e.g., reliant on the intrinsic localization of each individual aircraft, which can be sensitive to onboard sensing capabilities, GPS/GNSS availability, inertial sensing drift, etc.; typical ADS-B accuracy is about 95%). Additionally, ADS-B systems are not equipped on all aircrafts, meaning ADS-B data may be incomplete (missing estimates for some aircrafts/objects that a pilot may be requested to identify).

Thus, there is a need in the aviation field to create a new and useful system and/or method for directed aircraft perception. This invention provides such a new and useful system and/or method.

BRIEF DESCRIPTION OF THE FIGURES

FIG. 8 is a graphical representation of an example of a domain expert evaluation tool in a variant of the method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

1.1 Semantic Parsing

Figure 2:
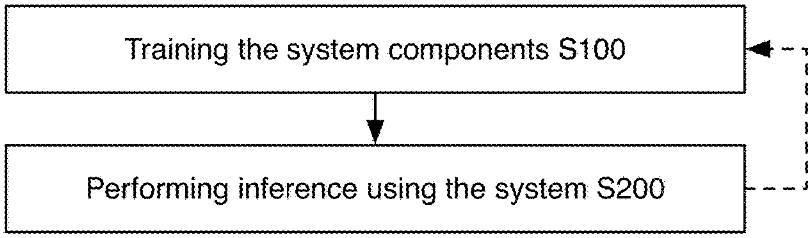
FIG. 2 is a diagrammatic representation of a variant of the method.

The semantic parsing method, an example of which is shown in FIG. 2, can include performing inference using the system S200; and can optionally include training the system components S100. The method functions to automatically interpret flight commands from a stream of air traffic control (ATC) radio communications. The method can additionally or alternatively function to train and/or update a natural language processing system based on ATC communications. Additionally, the method can include or be used in conjunction with collision avoidance and/or directed perception for traffic detection associated therewith.

Figure 3:
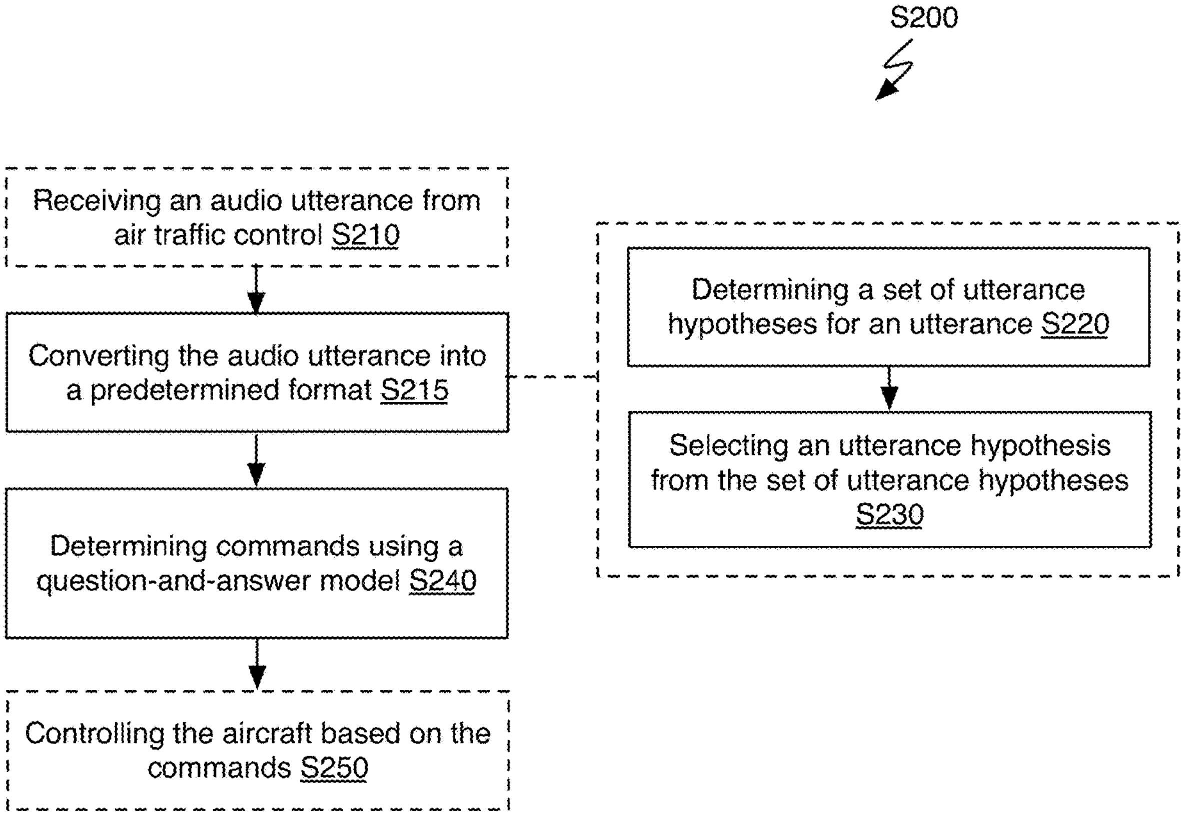
FIG. 3 is a diagrammatic representation of a variant of the method.

The performing inference S200 can include: at an aircraft, receiving an audio utterance from air traffic control S210, converting the audio utterance into a predetermined format S215, determining commands using a question-and-answer model S240, and optionally controlling the aircraft based on the commands S250 (example shown in FIG. 3). The method functions to automatically interpret flight commands from the air traffic control (ATC) stream. The flight commands can be: automatically used to control aircraft flight; presented to a user (e.g., pilot, a remote teleoperator); relayed to an auto-pilot system in response to a user (e.g., pilot) confirmation; and/or otherwise used.

In an illustrative example, the method can receive ATC audio stream, convert the ATC audio stream to ATC text, and provide the ATC text (as the reference text) and a predetermined set of queries (each associated with a different flight command parameter) to an ATC-tuned question and answer model (e.g., ATC-tuned BERT), which analyzes an ATC text for the query answers. The query answers (e.g., responses of the question and answer model) can then be used to select follow-up queries and/or fill out a command parameter value, which can be used for direct or indirect aircraft control. The ATC audio stream can be converted to the ATC text using an ATC-tuned integrated sentence boundary detection and automatic speech recognition model (SBD/ASR model) and an ATC-tuned language model, wherein an utterance hypotheses (e.g., a sentence hypothesis, utterance by an individual speaker, etc.) can be selected for inclusion in the ATC text based on the joint score from the SBD/ASR model and the language model.

S200 can be performed using a semantic parsing system 100 including a Speech-to-Text module and a question and answer (Q/A) module (e.g., cooperatively forming a semantic parser). The system functions to interpret audio air traffic control (ATC) audio into flight commands, and can optionally control the aircraft based on the set of flight commands.

The semantic parsing system 100 is preferably mounted to, installed on, integrated into, and/or configured to operate with any suitable vehicle (e.g., the semantic parsing system can include the vehicle). Preferably, the vehicle is an aircraft, but can alternately be a watercraft, land-based vehicle, spacecraft, and/or any other suitable vehicle. The semantic parsing system can be integrated with any suitable aircraft, such as a rotorcraft (e.g., helicopter, multi-copter), fixed-wing aircraft (e.g., airplane), VTOL, STOL, lighter-than-air aircraft, multi-copter, and/or any other suitable aircraft. However, the vehicle can be an autonomous aircraft, unmanned aircraft (UAV), manned aircraft (e.g., with a pilot, with an unskilled operator executing primary aircraft control), semi-autonomous aircraft, and/or any other suitable aircraft. Hereinafter, the term 'vehicle' can refer to any suitable aircraft, and the term 'aircraft' can likewise refer to any other suitable vehicle.

The semantic parsing system is preferably equipped on an autonomous aircraft, which is configured to control the aircraft according to a set of flight commands using a flight processing system without user (e.g., pilot) intervention. Alternatively, the semantic parsing system can be equipped on a semi-autonomous vehicle and/or human-operated vehicle as a flight aid. In a first variant, the semantic parsing system can display ATC commands to a user (e.g., pilot) and/or relay ATC commands to an auto-pilot system in response to a user (e.g., pilot) confirmation.

The term "tuned," as referenced in regard to neural networks, language models, or otherwise, can be understood to relate to tuning (e.g., adjusting) parameters (e.g., hyper-parameters, training parameters, variables, etc.) using training data. Accordingly, an ATC-tuned network can be understood as having parameters tuned based on ATC audio and/or ATC-specific semantic training data (as opposed to a network dedicated to a specific radio frequency band).

The term "traffic advisory" as utilized herein can refer to the term traffic advisory as relied upon by FAA, ATC, and/or general aviation guidelines. Additionally or alternatively, the term traffic advisory can refer to any suitable aircraft communications which pertain to air traffic, which can be used to inform/direct collision avoidance (e.g., even in cases where the ego aircraft is not specifically requested/required to identify said traffic). Accordingly, traffic advisories can be determined from ATC, communications of other aircraft on the same radio channel, communications intended for the ego aircraft (e.g., where the aircraft is the intended recipient), communications intended for other aircraft (e.g., where the aircraft is not the intended recipient), automated collision avoidance systems (e.g., TCAS, ACAS, remote collision avoidance/monitoring systems, etc.; which may be based on ground-based radar and transponder relays, space-based GPS, etc.), and/or any other suitable communications, advisories, and/or alerts. It is understood that, in some variants, the term traffic advisory as utilized herein can be interchangeably referenced with "traffic alert," "traffic communication," "aircraft advisory," and/or other like terms. However, the term "traffic advisory" can be otherwise suitably relied upon or referenced herein.

The term "negative contact" as utilized herein can refer to a failure to identify, perceive, locate, and/or detect an object/aircraft. For example, negative contact can refer to a lack of visual or other contact (e.g., transponder contact) with an adjacent aircraft (e.g., an aircraft associated with a traffic alert). As a second example, negative contact can be a term used by pilots to inform ATC that the previously issued traffic is not in sight (e.g., which may be followed by a request for the controller to provide assistance in avoiding the traffic). In a third example, the term negative contact as relied upon by FAA, ATC, and/or general aviation guidelines. However, the term "negative contact" can be otherwise suitably relied upon or referenced herein.

Though the systems and/or methods herein are addressed in reference to aircraft, it is understood that, in some variants, these systems, methods, and/or elements thereof can be applied to land-based vehicles, taxiing aircraft, and the like. Accordingly, in some variants, the term "aircraft" as referenced herein can interchangeably refer to a vehicle, automobile, fixed-wing aircraft, rotorcraft, watercraft, and/or any other suitable vehicle(s), and/or can be otherwise suitably referenced.

1.2 Directed Aircraft Perception

In variants, the perception system can use various sensors to detect other aircraft and/or objects in the vicinity in order to avoid collisions. In some cases, sensors (for example radar, cameras, or directional radio receivers) are arranged in an array. This may be because a single sensor's field of view is smaller than the overall sector of space in which traffic needs to be detected (for example a camera with a particular lens and image sensor resolution), or because an individual sensor cannot distinguish direction itself (for example a directional radio receiver) and which specific sensor detects traffic is indicative of the bearing to that traffic. Some detection methods (for example, computer vision using a camera or radar target detection) may utilize large amounts of signal processing. For example, computer vision may use a deep neural network detection method that requires teraflops worth of computation to detect traffic from images in a video stream. Variants can reduce the computational effort of the traffic detection system by directing its attention to a particular sector of airspace and/or sampling region of perception data. In variants, this direction can be based on NLP capabilities (e.g., semantic parsing of ATC communications) and/or auxiliary data sources (e.g., a low resolution, onboard inputs such as from a transponder, radar, and/or directional radio receiver; historical traffic data, etc.).

In a nominal operational mode, a traffic detection system can process sensor inputs from the full sensor array, which covers a wide sector around the aircraft. In the nominal operational mode, sensor inputs can be processed 'coarsely' in order to operate with available compute resources. For example, the rate at which the whole array is processed might be relatively low, or the sensor input data (for example from a camera) might be downsampled to a lower spatial resolution. The detection system can search for any traffic at any range in the coverage sectors, which includes many classes of aircraft that may appear at many apparent sizes depending on their range (e.g., a distant large jet may be perceived as apparently similar to a closer light aircraft, for example).

When a communication is received on the radio from air traffic control, the semantic parsing system 100 can process the audio into a semantic interpretation (e.g., via NLP). If the received communication pertains to traffic (for example, "traffic, one o'clock, 5 miles, traffic is a 737"), this information can be passed to the traffic detection system as a traffic advisory. The traffic detection system then increases its performance based on the information provided: it can process the sector of the array covering that bearing at higher rate or with higher resolution, reducing rate or resolution in the other array sectors where the presence of traffic is less of a risk. A priori knowledge about the detection profile of a 737 at a range of 5 miles (for example, its geometry and apparent size) can also improve the detection performance, for example by using a particular model trained on 737 detection and using a known size template for that range.

As an example, traffic communications received from ATC may indicate an object identifier (e.g., call sign), estimated/expected (ego-relative) position of aircraft/objects (e.g., "two 'o clock; two thousand feet above"), an object class (e.g., large aircraft class, such as a 737, or light aircraft such as a Cessna 172, etc.), and/or other distinguishing information or object characteristics (e.g., Airline, etc.).

1.3 Examples

In a first set of variants, a method for air traffic control (ATC)-directed collision avoidance on an aircraft includes: receiving an air traffic control (ATC) audio signal from a communication system; determining an utterance hypothesis from the ATC audio signal with automatic speech recognition (ASR); autonomously determining a traffic advisory by querying the utterance hypothesis with a pre-trained neural network model based on the utterance hypothesis, the traffic advisory comprising an estimated ego-relative position of an object; locating the object associated with the traffic advisory, comprising: based on aircraft perception data, performing an extended range search with a pretrained classifier, the extended range search directed based on the estimated ego-relative position; and performing an action based on the identification of the object.

In some examples, performing the action can include controlling the aircraft based on the object. In some examples, performing the action can include reporting negative contact (e.g., via an ATC radio) and/or determining a resolution advisory (e.g., automatically generating a resolution advisory; onboard the aircraft, remotely, etc.). In some examples, the aircraft perception data comprises a set of camera images collected onboard the aircraft. In some examples, the extended range search is directed by restricting an image pixel search space within the set of camera images based on a proximity of the estimated ego-relative position. In some examples, the method further includes refining the extended range search based on a set of historical traffic data. In some examples, the method further includes refining the extended range search based on aircraft position data from an Automatic Dependent Surveillance-Broadcast (ADS-B). In some examples, a detection range of the extended range search is between 2 and 5 nautical miles (e.g., which may advantageously improve detection accuracy for aircraft which may not be identified during a coarse, closer-range search). In some examples, the object comprises a second aircraft. In some examples, determining the utterance hypothesis from the ATC audio signal includes: with an integrated ASR and sentence boundary detection (SBD) module, generating a set of linguistic hypotheses based on the ATC audio signal; using an ATC-tuned language model, determining a respective language score for each linguistic hypothesis of the set of linguistic hypotheses; and determining the utterance hypothesis from the set of the linguistic hypotheses based on the respective language scores. In some examples, the traffic advisory is determined according to a sequence of the natural language queries.

In a second set of variants, nonexclusive with the first, a method for vehicle collision avoidance includes: receiving an audio signal; determining an utterance hypothesis for the audio signal; autonomously determining a traffic alert based on the utterance hypothesis; in response to determination of the traffic alert, performing an extended-range search with a pretrained classifier using vehicle perception data; based on the extended range search, identifying an object associated with the traffic alert; and determining a vehicle command based on the identification of the object.

In some examples, the vehicle comprises an aircraft and the object comprises a second aircraft, wherein the traffic alert comprises a traffic advisory from air traffic control (ATC). In some examples, the traffic alert comprises a position estimate for the object. In some examples, the method further includes automatically determining a resolution advisory, wherein the vehicle command is associated with the resolution advisory. In some examples, the extended range search is directed by restricting a search space within the set of camera images based on an estimated position of the object. In some examples, the estimated position of the object is based on aircraft position data from an Automatic Dependent Surveillance-Broadcast (ADS-B). In some examples, the method further includes refining the extended range search based on historical traffic data.

2. Benefits

Variations of the technology can afford several benefits and/or advantages.

First, variations of this technology can enable communication-directed vehicle perception (e.g., based on ATC communications), which can improve classification accuracy and/or extend the range of vehicle perception in an object (traffic) detection, collision avoidance, and/or navigational context (e.g., for navigation relative to terrain or terrestrial objects/structures, etc.). Additionally, such variants can improve the processing efficiency of object (traffic) detection and/or collision avoidance. For example, granular searches for objects (such as other aircraft in proximity to the flightpath) and/or high processing bandwidth searches can be performed in response to specific ATC communications or requests (e.g., discretely, discontinuously, etc.; as opposed to a continuous, coarser object detection routine which may be used to facilitate emergency collision avoidance relative to objects in close proximity to the aircraft, which may utilize less compute). Additionally, search spaces of granular and/or high processing bandwidth searches (e.g., extended range searches with a range between 2 and 5 nautical miles) can be restricted and/or refined based on ATC communications and/or other data sources (e.g., historical traffic patterns, Automatic Dependent Surveillance-Broadcast [ADS-B] data, etc.). However, variations of this technology can otherwise enable communication-directed vehicle perception.

Second, variants can partially or fully automate identification/classification of surrounding air traffic, or otherwise assist pilots in traffic detection, which may improve detection accuracy and thus reduce the frequency of ATC intervention to reroute traffic (e.g., in cases where surrounding traffic cannot be identified). Additionally, variants can partially or fully automate aircraft/pilot actions in the response to ATC requests (e.g., confirming identification, determining a resolution advisory, etc.).

Third, variants can confer increased semantic parsing accuracy over conventional systems by utilizing a multiple-query (or repeated question-and-answer) approach, for example by neural network (e.g., BERT), since existing deep neural network models have high intrinsic accuracy in responding to these types of questions.

Fourth, variations of this technology utilizing a multiple-query approach which asks natural language questions (e.g., "message intended for DAL456?"; "topics?"; "heading values?"; etc.) of a neural network can improve the interpretability and/or auditability of the semantic parser. In such variants, a specific module/model/query of the semantic parsing system can be identified as a point of failure when a user rejects a command, which can be used to further train/improve the semantic parsing system. In some variants, the multi-query approach can additionally enable portions of the semantic parser to be trained based on partial and/or incomplete tagged responses (e.g., which can be sufficient to answer a subset of the queries used to extract a command from an ATC transcript). As an example, training data can be used when values and/or aircraft tail numbers are not identified and/or validated within a training dataset.

Fifth, variations of this technology can enable semantic parsing of ATC utterances without the use of grammar rules or syntax-which can be time intensive to develop, slow to execute, and yield inaccurate results (particularly when handling edge case scenarios or unusual speech patterns). In an example: as a conversation between ATC and an aircraft continues, the ATC controller and the pilot often shorten phrases and/or deviate from the standard speech template, which can severely impact the efficacy of grammar/syntax-based NLP approaches. In variants, the semantic parsing system and/or method can convert unformatted audio, syntactically inconsistent (non-standardized) audio, and/or non-uniform audio data or corresponding ATC transcript into a standardized/formatted data input (e.g., as may be accepted/interpreted by a certified aircraft processor). In variants, standardized inputs can be utilized to certify aircraft systems in a deterministically testable manner. As an example, the technology can be used to convert an arbitrarily large number of audio signals into a substantially finite set of commands (e.g., with bounded ranges of values corresponding to a predetermined set of aircraft command parameters, which can be deterministically tested and/or repeatably demonstrated).

Sixth, variations of this technology can include an approach necessarily rooted in computer technology for overcoming a problem specifically arising in the realm of computer networks. In an example, the technology can automatically translate audio into a computer readable format which can be interpreted by an aircraft processor. In an example, the technology can enable control of a partially and/or fully autonomous system based on communications with ATC operators. In such examples, the system/method may act in place of an incapacitated pilot (e.g., for a manned aircraft) and/or replace an onboard pilot (e.g., for an unmanned aircraft).

Seventh, variations of this technology can enable high speed and/or high accuracy natural language processing (NLP) of air traffic control (ATC) utterances by leveraging neural network models that were pre-trained on other datasets (e.g., pretrained models), then tuned to ATC-specific semantics. These ATC-tuned models can improve the speed/accuracy of the semantic parsing system in the context of noisy, multi-speaker ATC channels. These ATC-tuned models can also retain the broad 'common sense' comprehension of the pre-existing model and avoid overly biasing the semantic parsing system towards conventional ATC language-thus enabling the semantic parsing system to effectively respond to edge case scenarios or speech patterns which infrequently occur in ATC communications.

However, variations of the technology can additionally or alternately provide any other suitable benefits and/or advantages.

3. Semantic Parsing System

Figure 1:
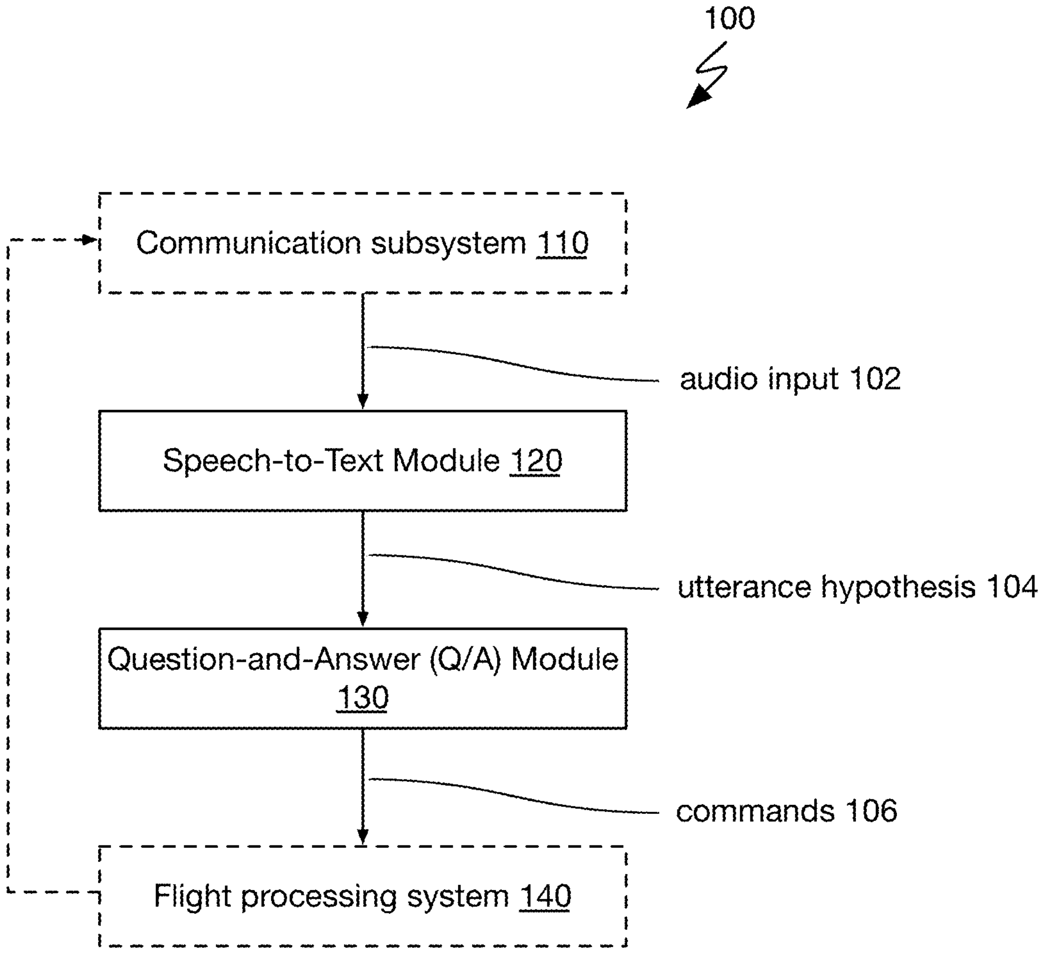
FIG. 1 is a schematic representation of a variant of the system.
Figure 13:
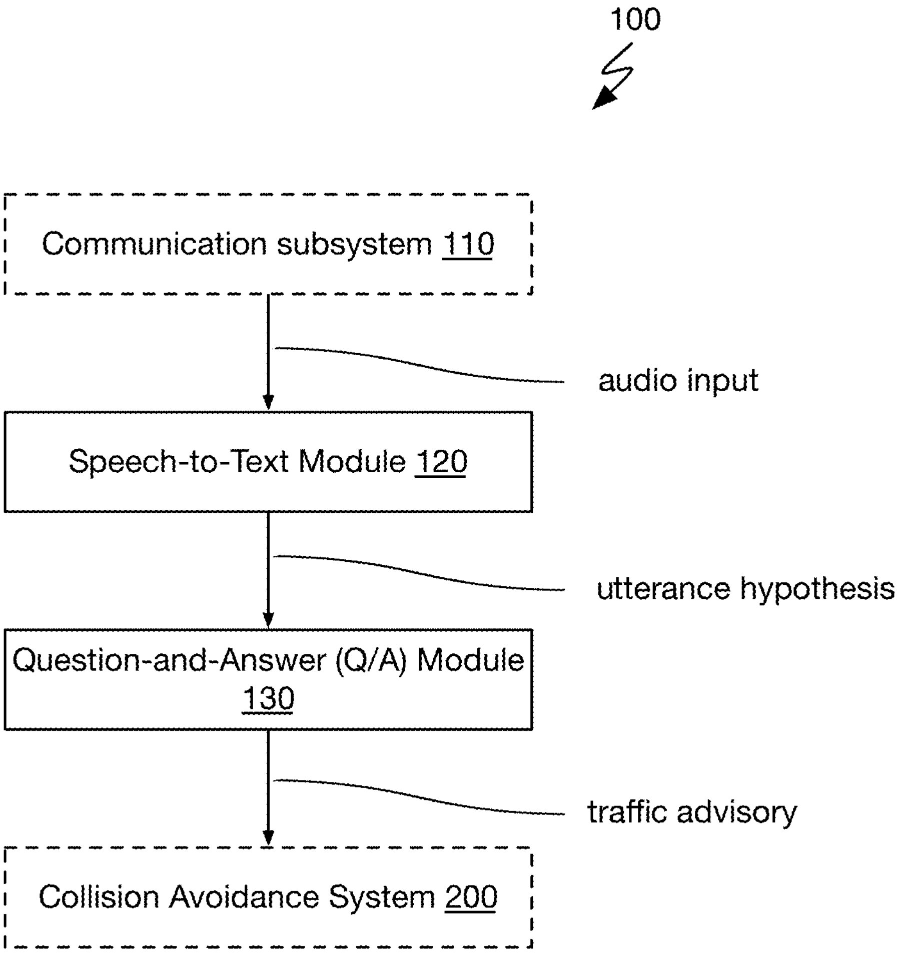
FIG. 13 is a schematic representation of a variant of the system.
Figure 14:
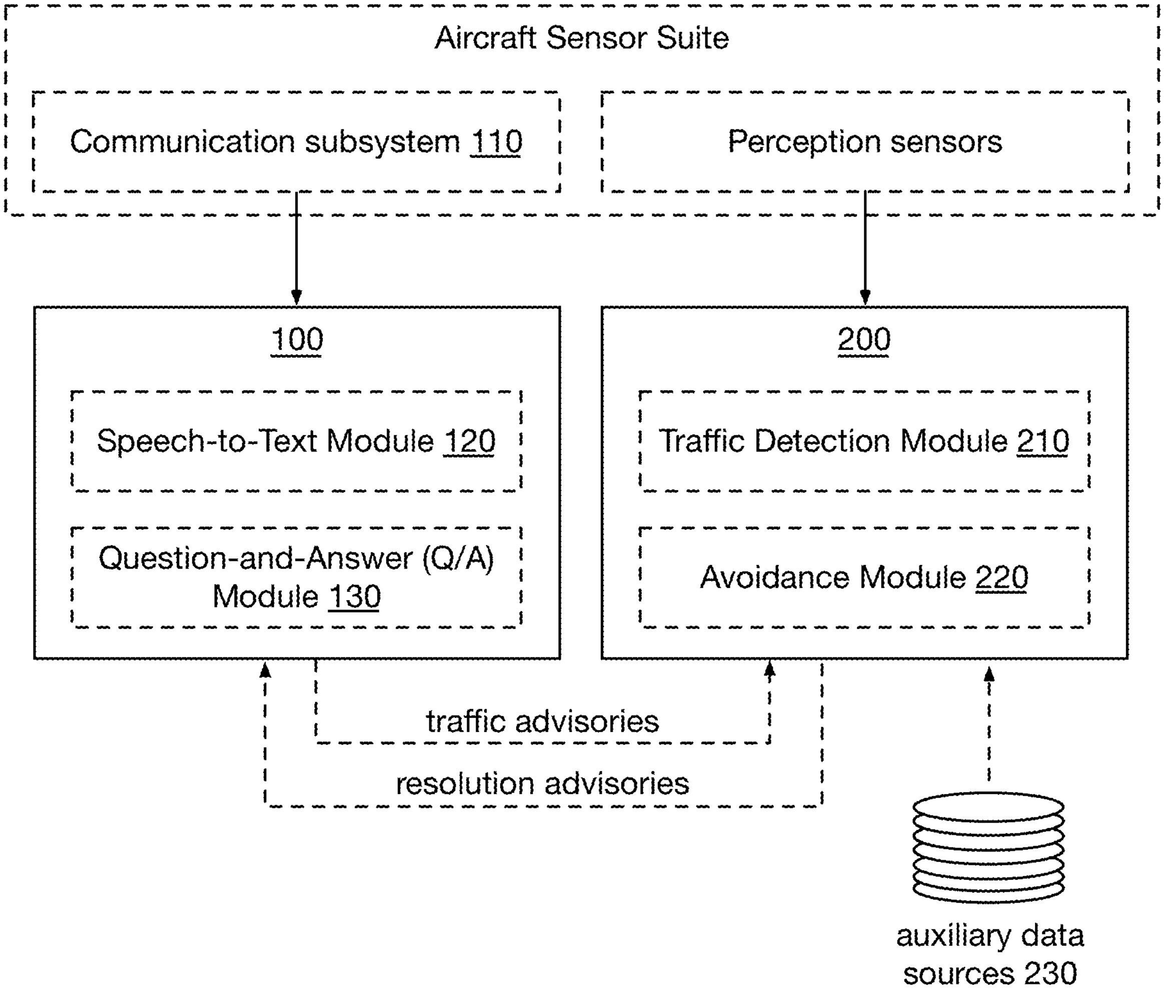
FIG. 14 is a schematic representation of a variant of the system.
Figure 15:
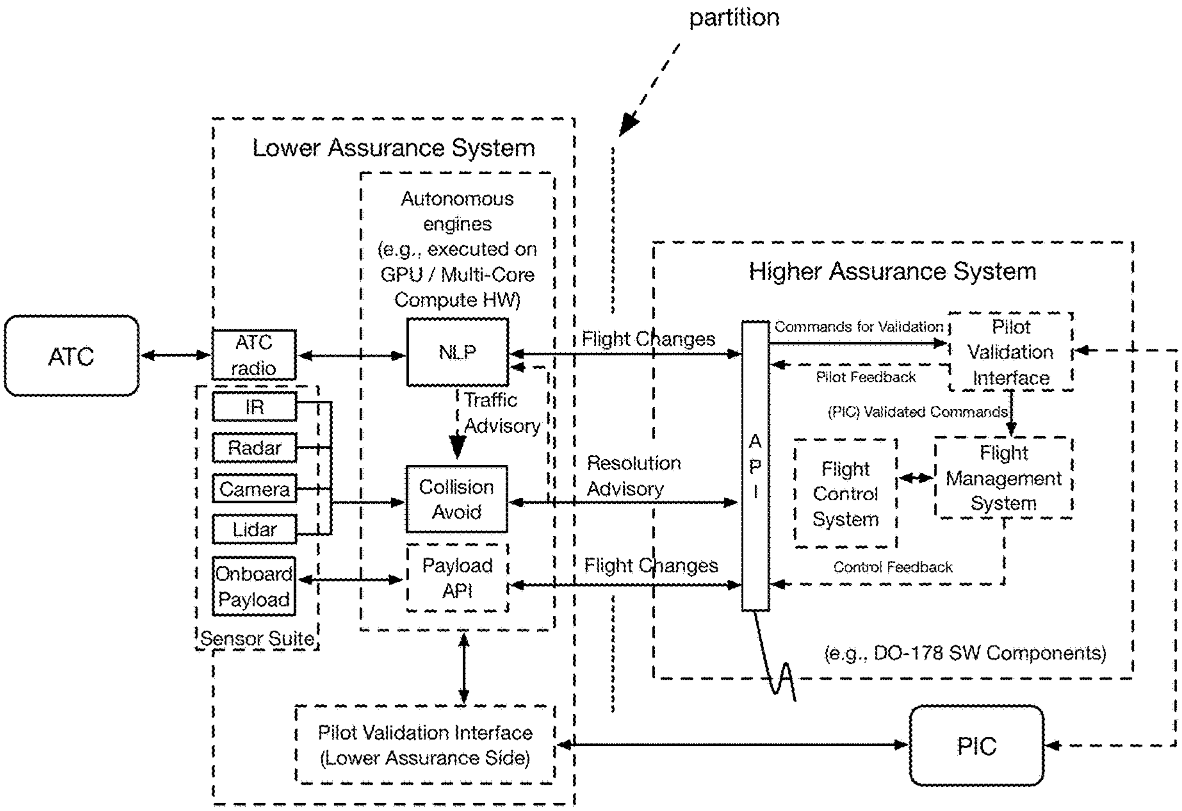
FIG. 15 is a schematic representation of a variant of the system.

The semantic parsing system 100, an example of which is shown in FIG. 1, can include: a Speech-to-Text module 120 and a question-and-answer (Q/A) module 130 (e.g., cooperatively the "semantic parser"). The semantic parsing system can optionally include a communication subsystem 110 and a flight processing system 140. However, the semantic parsing system 100 can additionally or alternatively include any other suitable set of components. The semantic parsing system 100 functions to determine flight commands 106 from an audio input 102 (e.g., received ATC radio transmission) which can be used for vehicle guidance, navigation, and/or control. In variants, the semantic parsing system 100 can optionally include or be used in conjunction with a collision avoidance system 200 (e.g., a first example is shown in FIG. 13; a second example is shown in FIG. 14; a third example is shown in FIG. 15) to facilitate directed perception and/or collision avoidance (e.g., in accordance with S300).

The audio input 102 can include a unitary utterance (e.g., sentence), multiple utterances (e.g., over a predetermined window-such as 30 seconds, within a continuous audio stream, over a rolling window), periods of silence, a continuous audio stream (e.g., on a particular radio channel, such as based on a current aircraft location or dedicated ATC communication channel), and/or any other suitable audio input. In a first example, the audio input can be provided as a continuous stream. In a second example, a continuous ATC radiofrequency stream can be stored locally, and a rolling window of a particular duration (e.g., last 30 seconds, dynamic window which is sized based on previous utterance detections, etc.) can be analyzed from the continuous radiofrequency stream.

The audio input is preferably in the form of a digital signal (e.g., radio transmission passed through an A/D converter and/or a wireless communication chipset), however can be in any suitable data format. In a specific example, the audio input is a radio stream from an ATC station in a digital format. In variants, the system can directly receive radio communications from an ATC tower and translate the communications into commands which can be interpreted by a flight processing system. In a first 'human in the loop' example, a user (e.g., pilot in command, unskilled operator, remote moderator, etc.) can confirm and/or validate the commands before they are sent to and/or executed by the flight processing system. In a second 'autonomous' example, commands can be sent to and/or executed by the flight processing system without direct involvement of a human. However, the semantic parsing system 100 can otherwise suitably determine commands from an audio input.

The semantic parsing system 100 is preferably mounted to, installed on, integrated into, and/or configured to operate with any suitable vehicle (e.g., the system can include the vehicle). The semantic parsing system 100 is preferably specific to the vehicle (e.g., the modules are specifically trained for the vehicle, the module is trained on a vehicle-specific dataset), but can be generic across multiple vehicles. The vehicle is preferably an aircraft (e.g., cargo aircraft, autonomous aircraft, passenger aircraft, manually piloted aircraft, manned aircraft, unmanned aircraft, etc.), but can alternately be a watercraft, land-based vehicle, spacecraft, and/or any other suitable vehicle. In a specific example, the aircraft can include exactly one pilot/PIC, where the system can function as a backup or failsafe in the event the sole pilot/PIC becomes incapacitated (e.g., an autonomous co-pilot, enabling remote validation of aircraft control, etc.).

Figure 12:
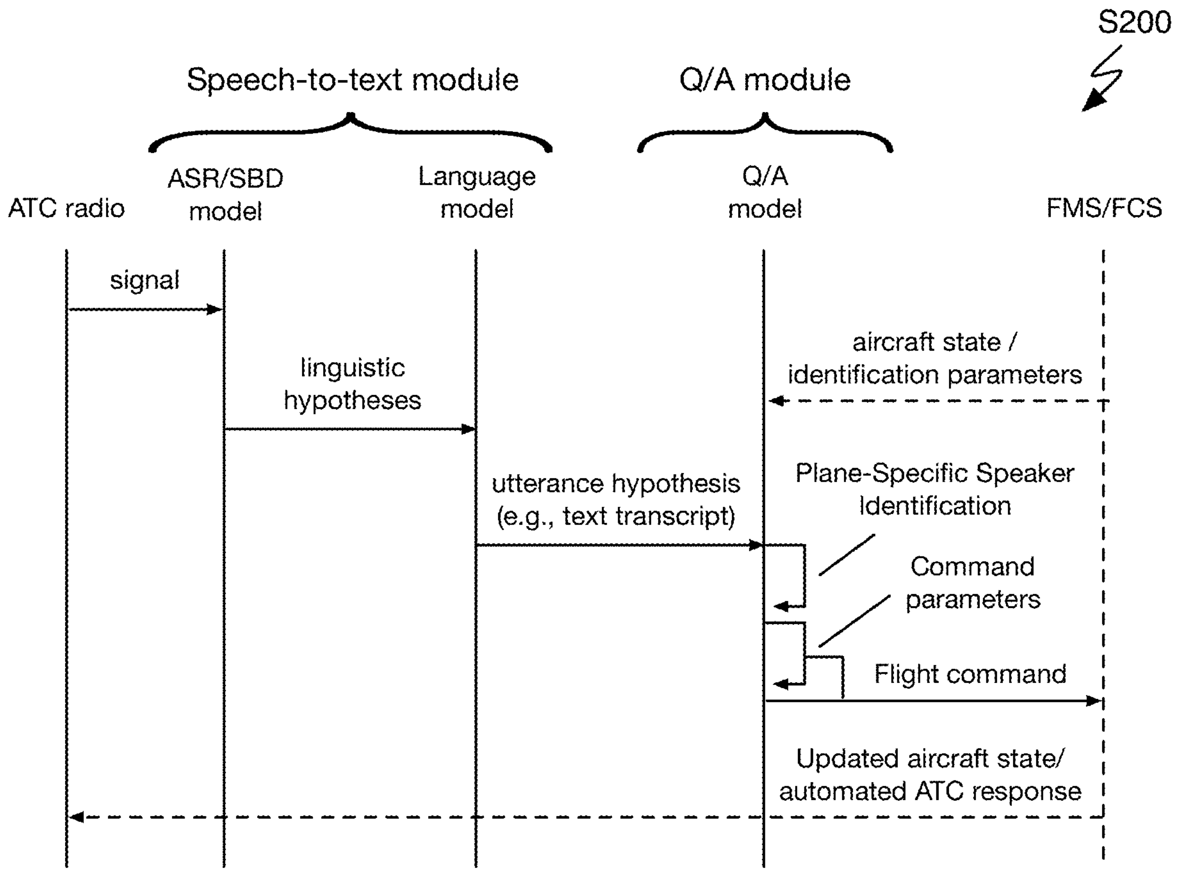
FIG. 12 is a diagrammatic representation of a variant of the system and/or method.

The semantic parsing system 100 can include any suitable data processors and/or processing modules. Data processing for the various system and/or method elements preferably occurs locally onboard the aircraft, but can additionally or alternatively be distributed among remote processing systems (e.g., for primary and/or redundant processing operations), such as at a remote validation site, at an ATC data center, on a cloud computing system, and/or at any other suitable location. Data processing for the Speech-to-Text module and Q/A module can be centralized or distributed. In a specific example, the data processing for the Speech-to-Text module and the Q/A module can occur at a separate processing system from the flight processing system (e.g., are not performed by the FMS or FCS processing systems; the Speech-to-Text module and Q/A module can be decoupled from the FMS/FCS processing; an example is shown in FIG. 12), but can additionally or alternatively be occur at the same compute node and/or within the same (certified) aircraft system. Data processing can be executed at redundant endpoints (e.g., redundant onboard/aircraft endpoints), or can be unitary for various instances of system/method. In a first variant, the semantic parsing system can include a first natural language processing (NLP) system, which includes the Speech-to-Text module and the Q/A module, which can be used with a second flight processing system, which includes the flight processing system and/or communication systems (e.g., ATC radio). In a second variant, an aircraft can include a unified 'onboard' processing system for all runtime/inference processing operations. In a third variant, remote (e.g., cloud) processing can be utilized for Speech-to-Text operations and/or Q/A response generation. However, the semantic parsing system 100 can include any other suitable data processing systems/operations.

The semantic parsing system 100 can optionally include a communication subsystem, which functions to transform an ATC communication (e.g., radio signal) into an audio input which can be processed by the ASR module. Additionally or alternately, the communication subsystem can be configured to communicate a response to ATC. The communication subsystem can include an antenna, radio receiver (e.g., ATC radio receiver), a radio transmitter, an A/D converter, filters, amplifiers, mixers, modulators/demodulators, detectors, a wireless (radiofrequency) communication chipset, and/or any other suitable components. The communication subsystem include: an ATC radio, cellular communications device, VHF/UHF radio, and/or any other suitable communication devices. In a specific example, the communication subsystem is configured to execute S210. However, the communication subsystem can include any other suitable components, and/or otherwise suitably establish communication with air traffic control (ATC).

The Speech-to-Text module of the semantic parsing system 100 functions to convert the audio input (e.g., ATC radio signal) into an utterance hypothesis 104, such as in the form of text (e.g., an ATC transcript) and/or alphanumeric characters. The utterance hypothesis is preferably a text stream (e.g., dynamic transcript), but can alternatively be a text document (e.g., static transcript), a string of alphanumeric characters (e.g., ASCII characters), or have any other suitable human-readable and/or machine-readable format. The Speech-to-Text module is preferably onboard the aircraft, but can additionally or alternatively be remote. The Speech-to-Text module is preferably an ATC-tuned Speech-to-Text module, which includes one or more models pre-trained on ATC audio data, but can additionally or alternatively include one or more generic models/networks and/or models/networks pre-trained on generalized training data (e.g., natural language utterances not associated with ATC communication).

The Speech-to-Text module can include: an integrated automatic speech recognition (ASR) module 122, a sentence boundary detection (SBD) module 124, a language module 126, and/or other modules, and/or combinations thereof. In a specific example, the Speech-to-Text module can include an integrated ASR/SBD module 125. The Speech-to-Text module (and/or submodules thereof) can include a neural network (e.g., DNN, CNN, RNN, etc.), a cascade of neural networks, compositional networks, Bayesian networks, Markov chains, predetermined rules, probability distributions, attention-based models, heuristics, probabilistic graphical models, or other models. The Speech-to-Text module (and/or submodules thereof) can be tuned versions of pretrained models (e.g., pretrained for another domain or use case, using different training data), be trained versions of previously untrained models, and/or be otherwise constructed.

In variants, a submodule(s) of the Speech-to-Text module (e.g., ASR module and/or SBD module) can ingest the audio input (e.g., audio stream, audio clip) and generate a set of linguistic hypotheses (e.g., weighted or unweighted), which can serve as an intermediate data format, such as may be used to audit the Speech-to-Text module, audit sub-modules/models therein, and/or select a unitary utterance hypothesis. The set of linguistic hypotheses can include overlapping/alternative hypotheses for segments of audio, or can be unitary (e.g., a single hypothesis for an individual audio segment or time period). The set of linguistic hypotheses can include: utterance hypotheses (e.g., utterance hypothesis candidates), letters, word-segment streams, phonemes, words, sentence segments (e.g., text format), word sequences (e.g., phrases), sentences, speaker changes, utterance breaks (e.g., starts, stops, etc.), and/or any other suitable hypotheses. In variants where the audio stream includes multiple speakers/utterances, the set of linguistic hypotheses can additionally include an utterance boundary hypothesis which can distinguish multiple speakers and/or identify the initiation and termination of an utterance, with an associated weight and/or a speaker hypothesis (e.g., tag identifying a particular speaker, tag identifying a particular aircraft/tower). Additionally or alternately, the utterance boundary hypothesis can identify utterance boundaries and/or change in speaker without identifying individual speaker(s). Each linguistic hypothesis preferably includes an associated weight/score associated with an utterance (and/or utterance boundary), assigned according to a relative confidence (e.g., statistical; such as determined using an ASR model, SBD model, and/or language model; etc.). The set of linguistic hypotheses is preferably ordered, sequential, and/or time-stamped in association with the receipt time, but can be otherwise suitably related.

However, the Speech-to-Text module can generate, store, and/or output any other suitable set of hypotheses. As an example, the linguistic hypotheses can include a plurality of utterance hypotheses, wherein a single utterance hypothesis can be selected based on the set of generated set of utterance hypotheses. As a second example, a subset (e.g., complete set) of linguistic hypotheses, with a corresponding weight/score, can be output by the Speech-to-Text module.

The Speech-to-Text module can include an ASR module which functions to extract linguistic hypotheses from the audio input. Using the audio input, the ASR module can determine a sequence of linguistic hypotheses, such as: letters, word-segment streams, phonemes, words, sentence segments (e.g., text format), word sequences (e.g., phrases), sentences, and/or any other suitable linguistic hypotheses (e.g., with a corresponding weight). The ASR module is preferably a neural network (e.g., Wav2Letter, Kaldi, Botium, etc.), but can alternatively be any other suitable model. In an example, a pretrained neural network can be tuned for ATC audio and/or trained using ATC audio (e.g., with an associated transcript). In a second example, the ASR module can include the ASR model trained by S110 and/or S120. In a specific example, the ASR module is configured to execute S220 of the method. The ASR module can optionally include an integrated SBD module. In variants where the ASR module outputs lower-level linguistic components (e.g., phonemes, phonetics, etc.), the semantic parsing system can optionally include auxiliary transformation modules (e.g., phoneme-to-word transformations) that convert the lower-level linguistic components to linguistic components compatible by the language module and/or other modules.

Figure 10A:
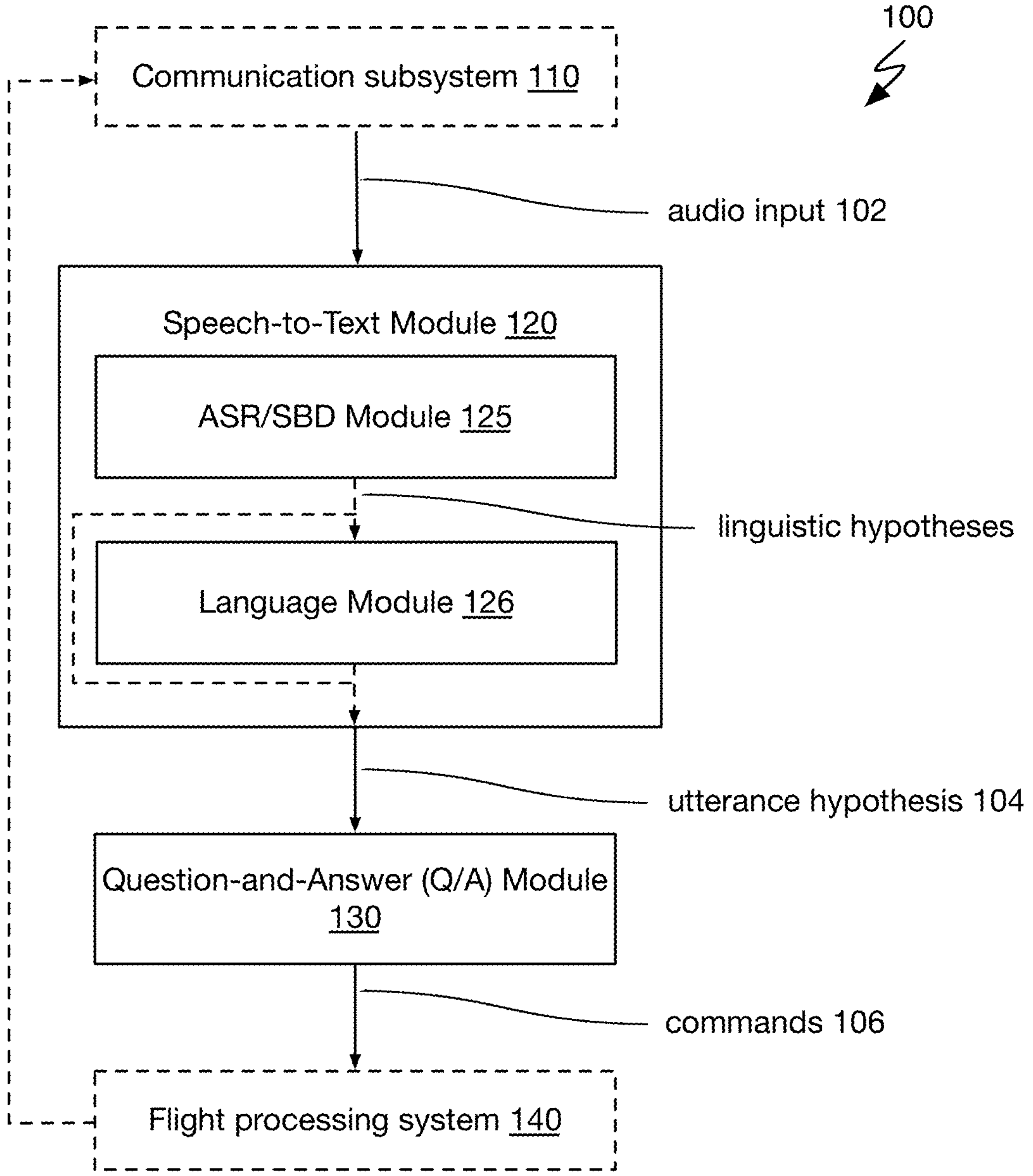
FIGS. 10A-D are diagrammatic representations of a first, second, third, and fourth variant of the system, respectively.
Figure 10B:
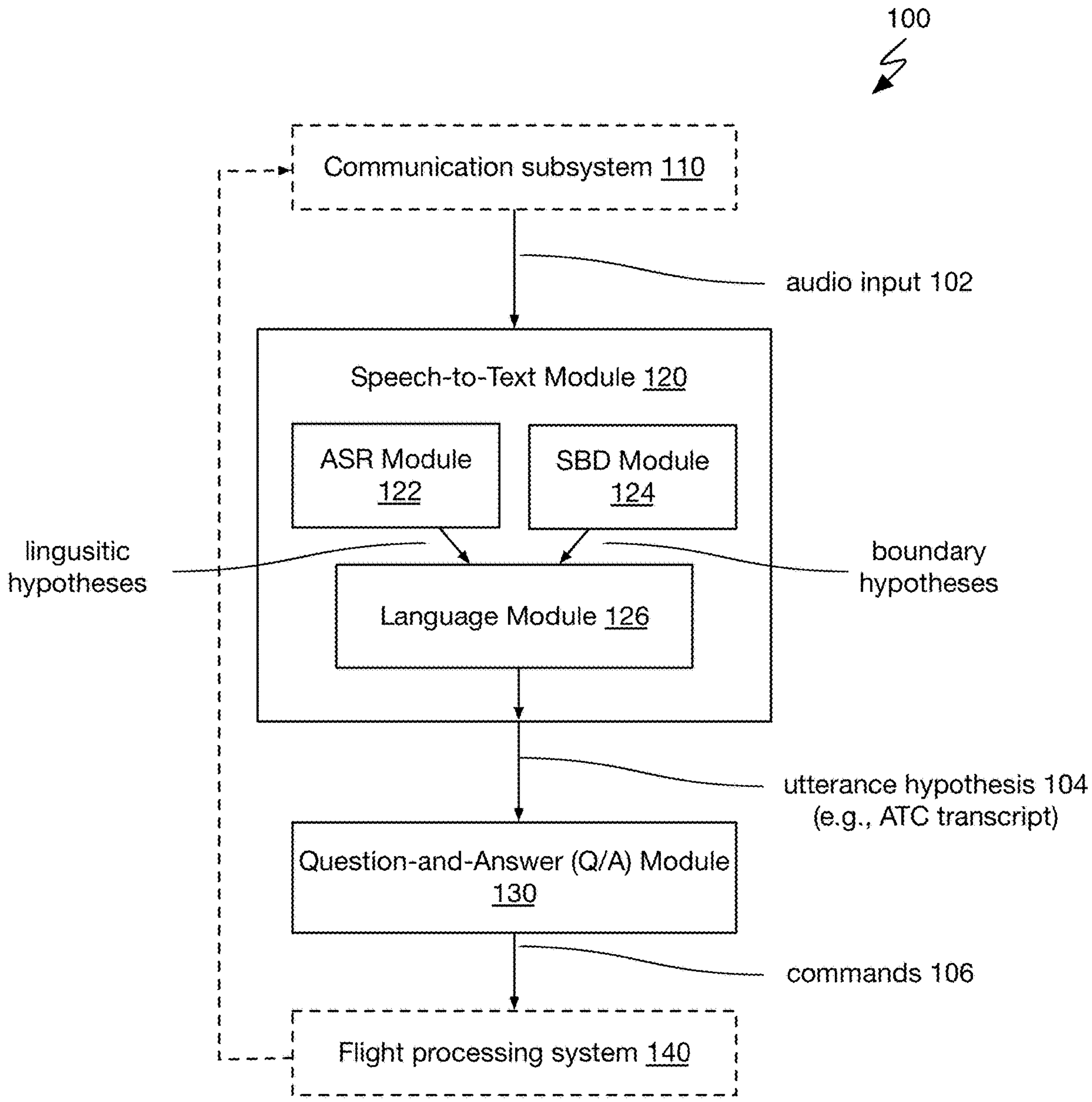
Figure 10C:
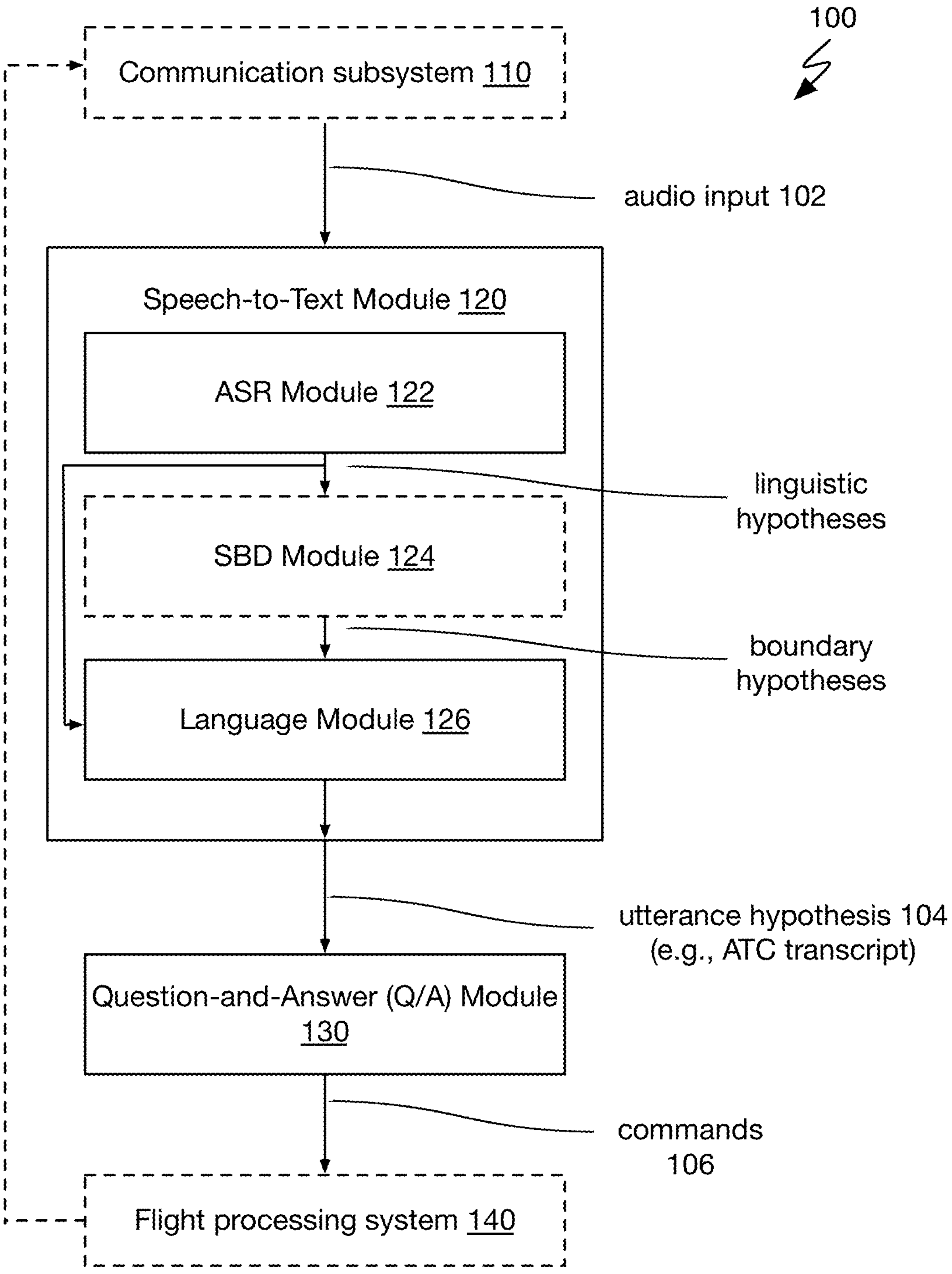
Figure 10D:
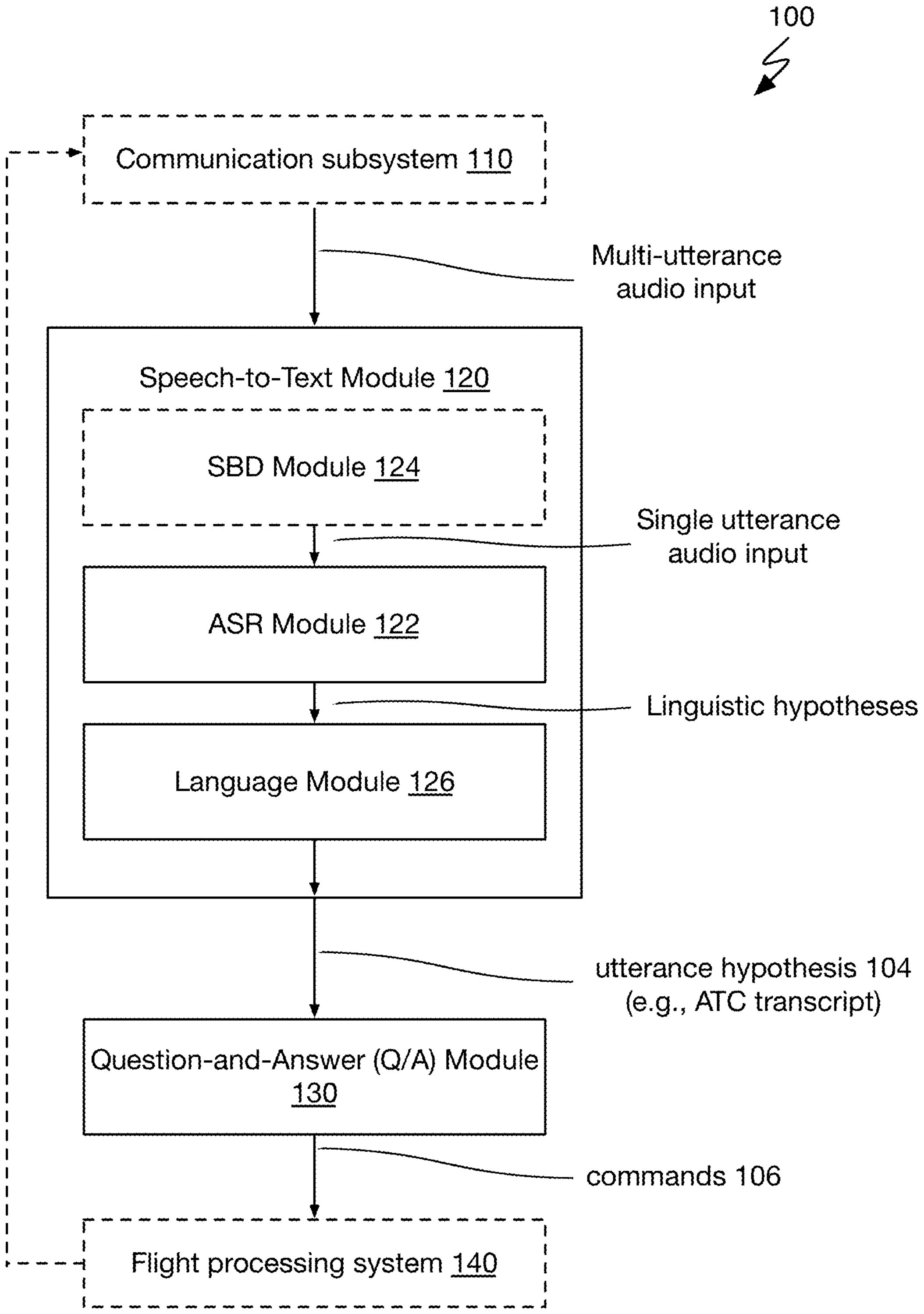

The Speech-to-Text module can include an SBD module which functions to identify utterance boundaries and/or speaker changes for a multi-utterance audio inputs. Using the audio input, the SBD module can determine a sequence of linguistic hypotheses, such as: an utterance boundary hypothesis, a speaker hypothesis (e.g., tag identifying a particular speaker, tag identifying a particular aircraft/tower), and/or any other suitable hypotheses. The SBD module is preferably integrated with the ASR module (an example is shown in FIG. 10A), but can otherwise be separate from the ASR module, such as operating sequentially with the ASR module (e.g., passing a single utterance input into the ASR module, tagging outputs of the ASR module, etc.; examples are shown in FIGS. 10C-D) or in parallel with the ASR module (e.g., separately providing speaker change and/or utterance boundary annotations by way of time stamps, etc.; an example is shown in FIG. 10B). The SBD module is preferably a neural network (e.g., Wav2Letter, Kaldi, Botium, etc.), but can alternatively be any other suitable model. In an example, a pretrained SBD neural network can be tuned for ATC audio and/or trained using ATC audio (e.g., with an associated transcript). In a second example, an SBD neural network can be trained separately from the ASR module (e.g., using a distinct training set, using a training set including periods of radio silence and/or audio artifacts, etc.). In a third example, the SBD model can be tuned for ATC audio and/or trained using ATC audio, such as trained to identify silence speakers and/or utterance boundary characters (e.g., transition speakers, transition audio artifacts). However, the Speech-to-Text module can include any other suitable SBD module(s).

The language module of the Speech-to-Text module functions to select an utterance hypothesis based on the set of linguistic hypotheses, which can then be passed into the Q/A module. The language module receives the set of linguistic hypotheses from the ASR module (e.g., phonemes, words, sentence subsets, etc.) and returns an utterance hypothesis associated with a single utterance (e.g., a sentence, a series of linguistic hypothesis, etc.). The language module preferably determines the utterance hypothesis purely from the linguistic hypotheses, but can alternatively or additionally ingest the audio input and/or other auxiliary data. Auxiliary data can include: an aircraft ID, contextual information (e.g., vehicle state, geographical position, ATC control tower ID and/or location, etc.), weather data, and/or any other suitable information. The utterance hypothesis is preferably text (e.g., a text string or utterance transcript), but can alternatively be a set of phoneme indexes, audio, or any suitable data format.

The language module preferably selects an utterance hypothesis from the set of linguistic hypotheses by weighting the likelihood of various ‘sound-based’ language interpretations in the context of the entire utterance and/or ATC language patterns. In a first variant, the language module assigns language weights/scores to each utterance hypothesis using a neural network language model (e.g., an LSTM network, a CNN, FairSeq ConvLM, etc.) tuned for ATC language (e.g., neural network trained using ATC transcripts, etc.; such as a language model trained according to S140). In a second variant, the language module assigns language weights/scores according to a grammar-based language model (e.g., according to a set of heuristics, grammar rules, etc.). In a third variant, the language module can be tightly integrated with the ASR module. In examples, a language model(s) can be used during the search, during the first pass, and/or during reranking. However, the language module can assign weights/scores in any other suitable manner. In a specific example, the language module is configured to execute S230 of the method.

In an example, the Speech-to-Text module transforms an ATC audio stream into a natural language text transcript which is provided to the Q/A module, preserving the syntax as conveyed by the ATC speaker (e.g., arbitrary, inconsistent, non-uniform syntax).

Alternatively, the speech-to-text module can include a neural network trained (e.g., using audio data labeled with an audio transcript) to output utterance hypotheses (e.g., one or more series of linguistic components separated by utterance boundaries) based on an audio input. However, the speech-to-text module can include: only an automated speech recognition module, only a language module, and/or be otherwise constructed.

However, the semantic parsing system can include any other suitable Speech-to-Text module.

Figure 7:
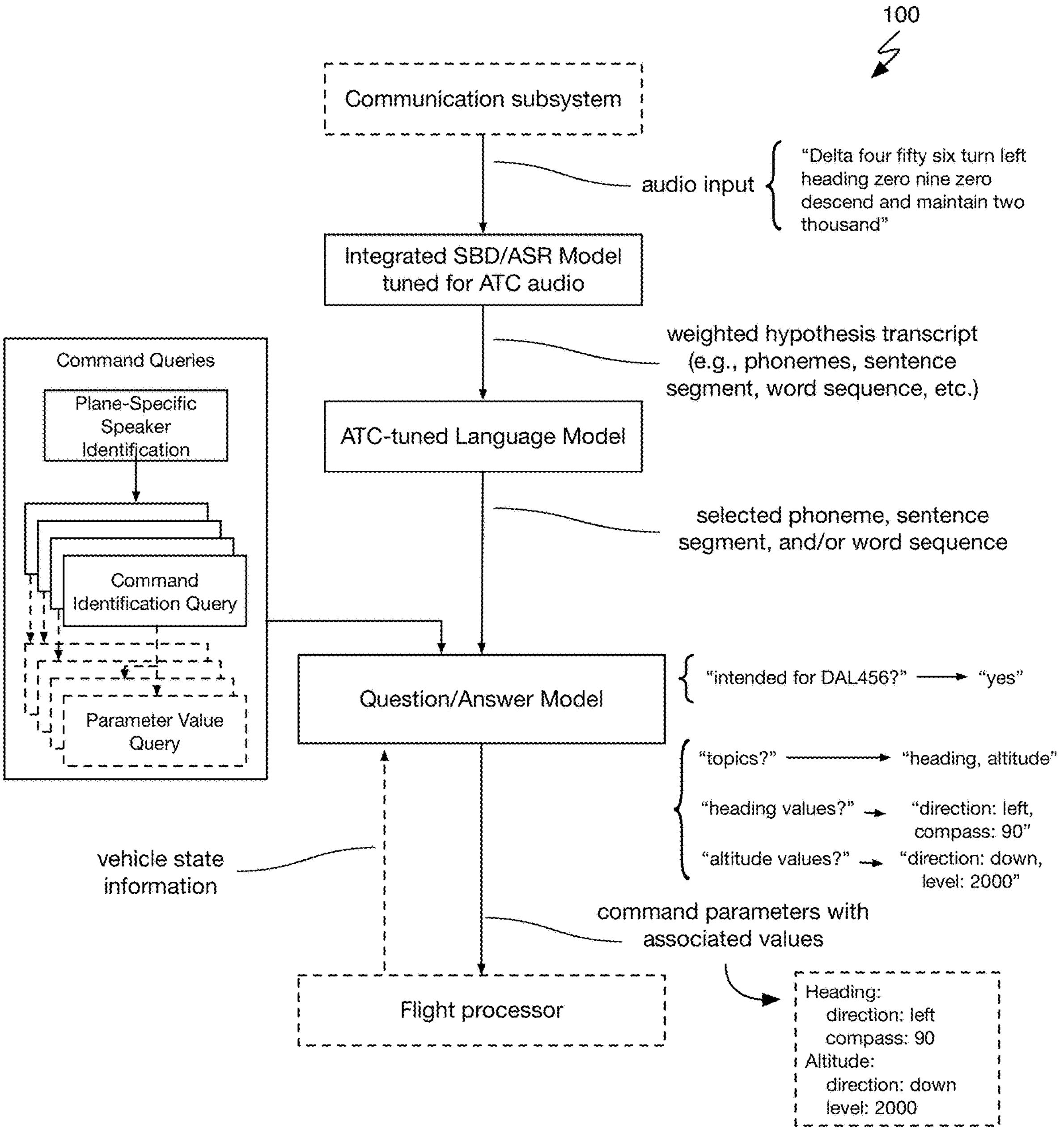
FIG. 7 is a schematic representation of an example of the system.

The semantic parsing system 100 can include a question-and-answer (Q/A) module (example shown in FIG. 7), which functions to determine a set of commands from the selected hypothesis (e.g., text transcript) using a set of flight command queries. The Q/A module preferably receives an utterance hypothesis from the Speech-to-Text module in text, but can alternately receive audio and/or any other suitable inputs.

The Q/A module preferably includes one or more Q/A models (e.g., BERT, BERT tuned to ATC applications, etc.), but can additionally or alternatively include a classifier or other model. The Q/A model is preferably a pre-trained language model tuned for ATC transcripts but can be untrained or have another format. The Q/A model can be: a convolutional neural network, a (pre-trained) large neural language model, bidirectional encoder representations from transformers (BERT), generative pre-trained transformer (GPT), and/or any other suitable language model. However, the Q/A module can include any other suitable neural language models.

Figure 11A:
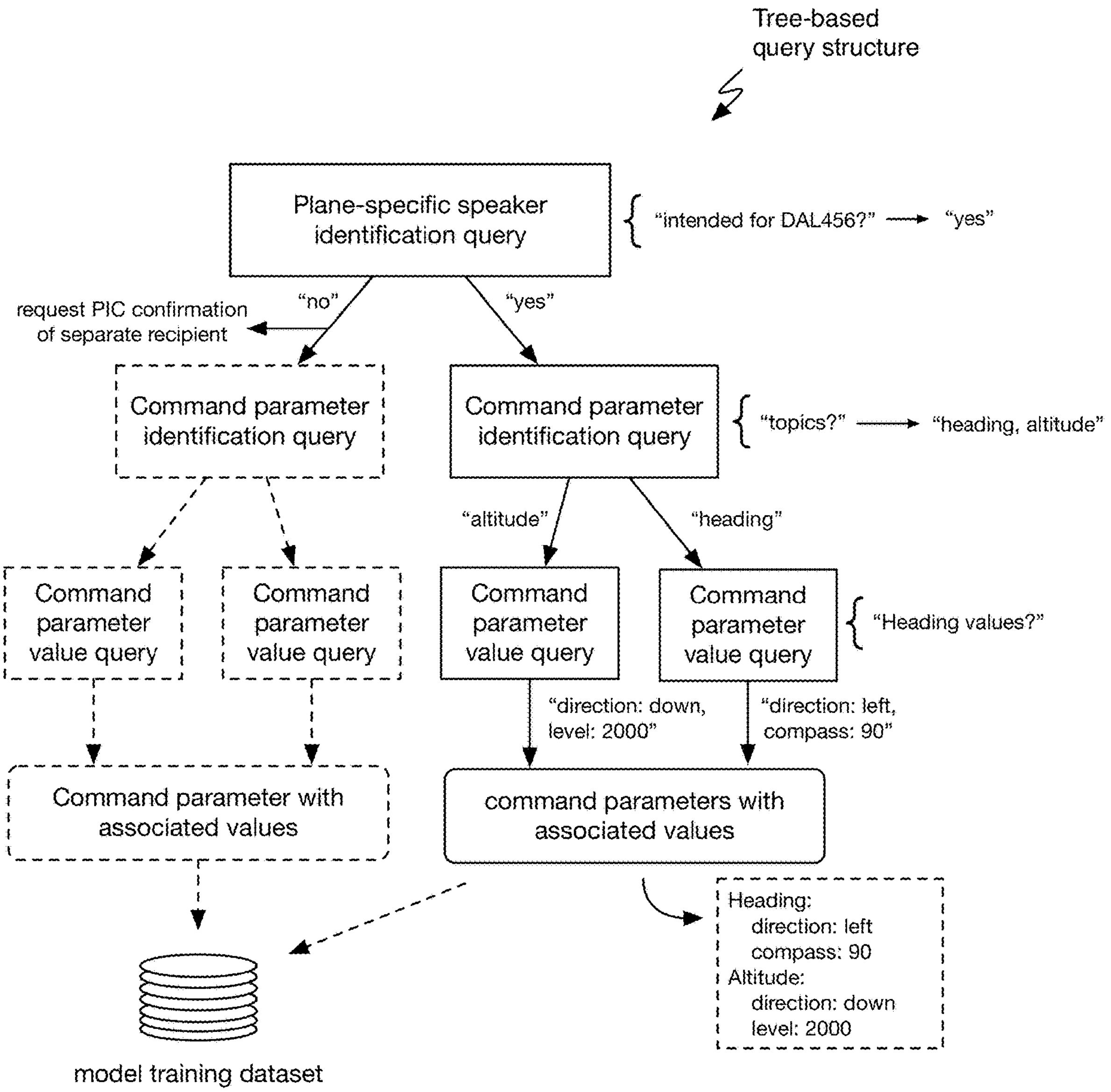
FIGS. 11A-C are first, second, and third examples of tree-based query structures, respectively.
Figure 11B:
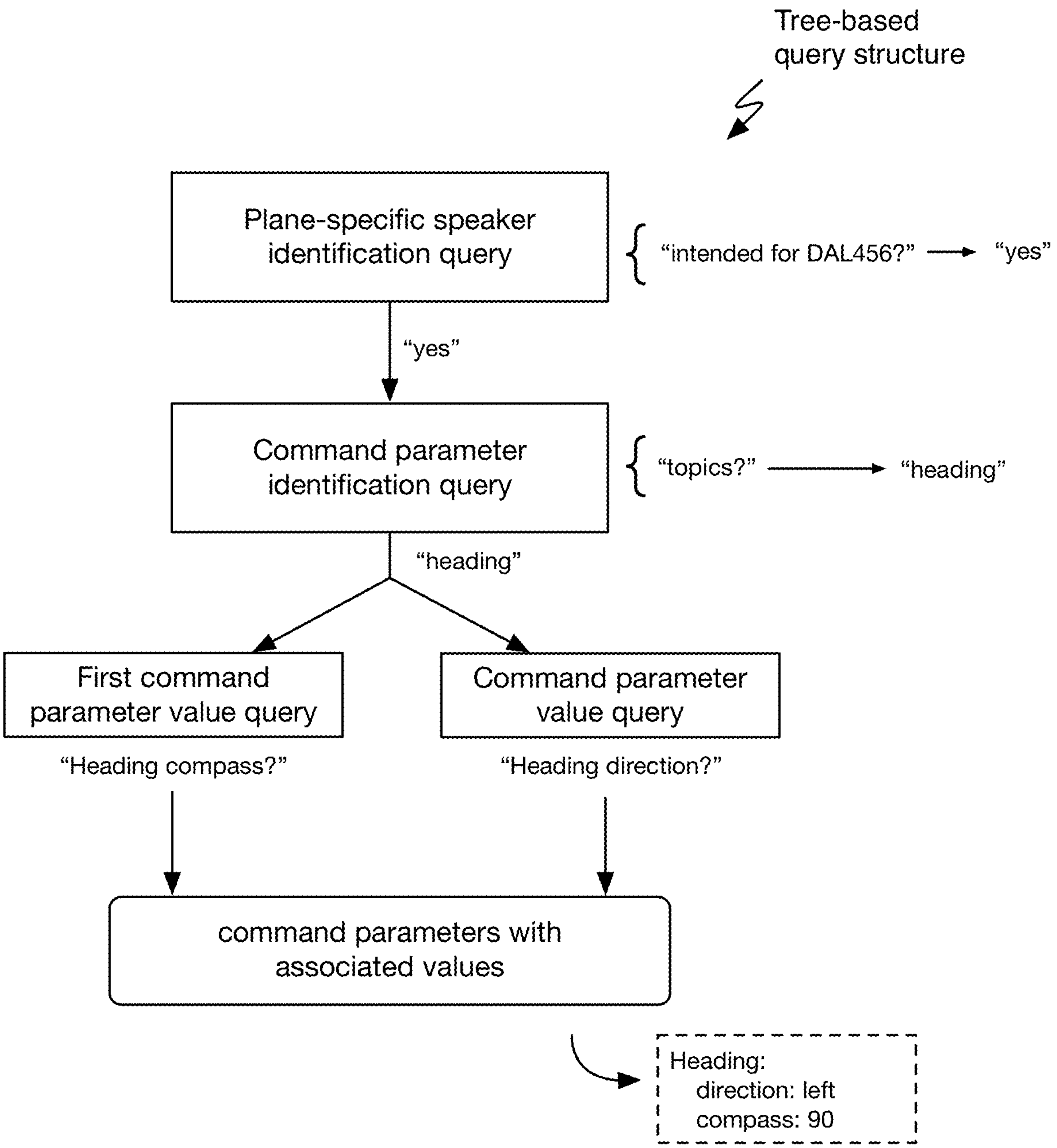
Figure 11C:
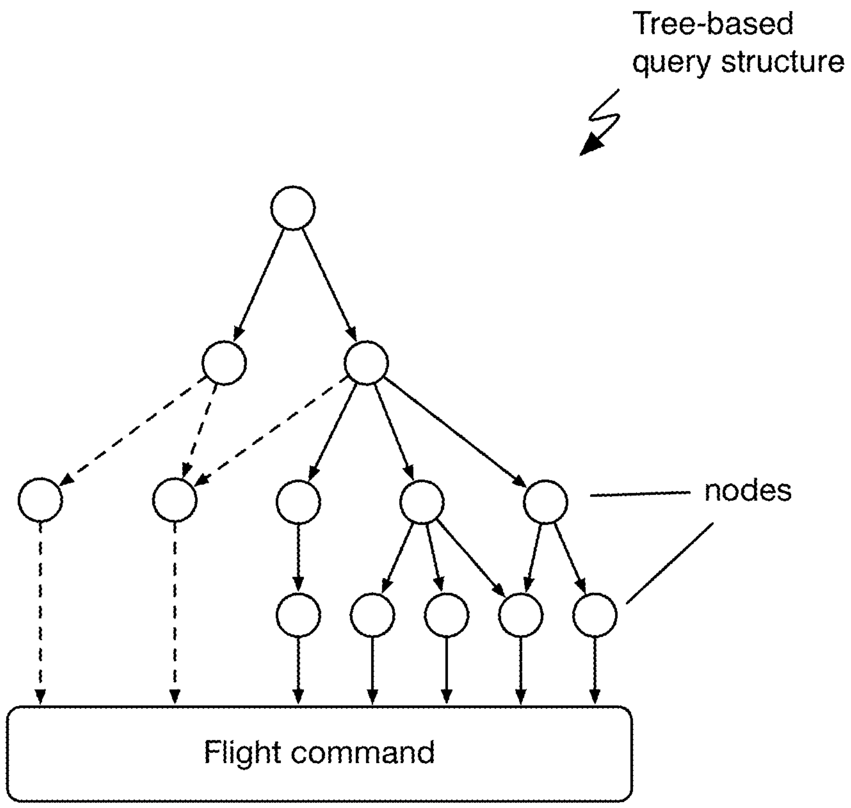

The Q/A module preferably answers a set of flight command queries (e.g., natural language queries). The flight command queries are preferably predetermined (e.g., manually determined, extracted from a command template, etc.), but can be dynamically determined. Flight command queries are preferably semantic queries in a human-readable format, but can additionally or alternatively be provided in a machine-readable format. The command queries are preferably natural language ("reading comprehension"), but can alternatively be vectors, tensors, and/or have another format. The set of flight command queries is preferably organized in a hierarchical structure (e.g., with parent-child query relationships), but can alternatively be organized in a serial structure, or be otherwise organized. The flight command queries can be organized in a list, a tree, or otherwise organized. In variants, flight command queries can be provided as a sequence/series of chained nodes (examples are shown in FIGS. 11A-C), each node corresponding to a predetermined query, wherein the nodes include a set of independent nodes and a set of dependent nodes, each dependent node linked to a specific answer/response (e.g., specific answer value) of a broader/higher-level parent semantic query (e.g., where queries have a finite set of answers or a closed range of answers). Accordingly, dependent queries may be triggered in response to a determination of a predetermined answer at a higher-level linked node. Alternatively, the set of predetermined flight command queries can be provided synchronously or asynchronously in any suitable combination/permutation of series and/or parallel.

The command queries can be configured to have binary answers (e.g., "yes", "no", discrete answers (e.g., letters, integers, etc.), continuous answers (e.g., coordinate values, etc.), and/or any other suitable type of answer value. Different types of commands can have different query structures. For example, high-criticality queries, such as aircraft identifiers, can be structured as binary queries. In another example, attributes with multiple potential answers can be structured as open-ended questions (e.g., "topics?") instead of binary questions (e.g., "Does the utterance include heading?" Does the utterance include altitude?"). However, the queries can be otherwise structured. Examples of command queries include: whether the aircraft is the intended recipient of an utterance hypothesis, what or whether command parameters or topics (e.g., heading, altitude, etc.) are included in the utterance hypothesis, what or whether command parameter values (e.g., altitude direction, altitude level, etc.) are included in the utterance hypothesis, and/or other queries. In a first example, the Q/A module determines that the utterance is intended for the aircraft (e.g., Question: "Intended for DAL456?"; Answer: "yes"). In a second example, the Q/A module determines the topics of an utterance (e.g., Question: "Topics?"; Answer: "Heading, Altitude"). In a third example, the Q/A determines the values associated with a topic of the utterance (e.g., Question: "Altitude values?"; Answer: "Direction: down, Level: 2000"). In an example, the Q/A module can be configured to execute S240.

Based on the queries, the Q/A module outputs a set of flight commands, which can include guidance commands (e.g., navigational instructions; sequences of waypoints, approach landing site, etc.), vehicle state commands (e.g., instructions to modify vehicle state parameters, increase altitude to 5000 ft, etc.), effector state commands (e.g., effector instructions; deploy landing gear, etc.), flightpath commands (e.g., trajectory between waypoints, etc.), and/or any other suitable commands. The commands preferably output in a prescribed format based on the answers generated by the Q/A module, such as a standardized human-readable format (e.g., allowing human validation) and/or a machine-readable format (e.g., allowing human interpretation/validation of the commands). In a specific example, the commands can be provided as the union of the answers to the command parameter identification query and at least one command parameter value query (e.g., corresponding to the answer of the command parameter identification query). In a second example, the commands can be directly taken as a combination of each answer/response as generated by the Q/A module. Output commands are preferably text based and/or alphanumeric, but can be otherwise suitably provided (e.g., text-to-speech validation, etc.). In some variants, the commands can be post-processed according to any suitable heuristics, grammar rules, or formatting protocols, but can otherwise be provided to a pilot and/or flight processing system directly as the output of the Q/A module. In a specific example, the Q/A module can convert an utterance hypothesis into a command in a standardized data format (e.g., as may be accepted/interpreted by a certified aircraft processor). In variants, the commands can include a substantially finite set of command parameters (e.g., altitude, heading, etc.) corresponding to a predetermined set of topics. Additionally, command parameters can be within substantially finite and/or bounded ranges (e.g., heading limited to compass directions, altitude limited by physical aircraft constraints, commands cooperatively limited by flight envelope, etc.). However, command parameters can additionally or alternatively be arbitrary, unbounded, and/or substantially unconstrained. However, the Q/A module can generate any other suitable commands.

However, the semantic parsing system can include any other suitable Q/A module.

The semantic parsing system 100 can optionally include and/or be used with a flight processing system, which functions to control various effectors of the aircraft according to the commands. The flight processing system can include an aircraft flight management system (FMS), a flight control system (FCS), flight guidance/navigation systems, and/or any other suitable processors and/or control systems. The flight processing system can control flight effectors/actuators during normal operation of the vehicle, takeoff, landing, and/or sustained flight. Alternatively, the flight processing system can be configured to implement conventional manual flight controls in a flight-assistive configuration. The semantic parsing system can include a single flight processing system, multiple (e.g., three) redundant flight processing systems, and/or any other suitable number of flight processing systems. The flight processing system(s) can be located onboard the aircraft, distributed between the aircraft and a remote system, remote from the aircraft, and/or otherwise suitably distributed. In a specific example, the flight processing system is configured to execute S250.

In variants, the flight processing system can be configured (e.g., certified) to accept only a predetermined set of command input and/or inputs having a predetermined format, where the outputs of the Q/A model are provided in the predetermined format and/or are a subset of the predetermined set of commands.

However, the semantic parsing system can include any other suitable components and/or be otherwise suitably configured to execute S200 of the method.

4. Semantic Parsing Method

The method, an example of which is shown in FIG. 2, can optionally include training the system components S100;

and performing inference using the system S200. The method functions to automatically interpret flight commands from a stream of air traffic control (ATC) radio communications. The method can additionally or alternatively function to train and/or update a natural language processing system based on ATC communications.

4.1 Training

Figure 9:
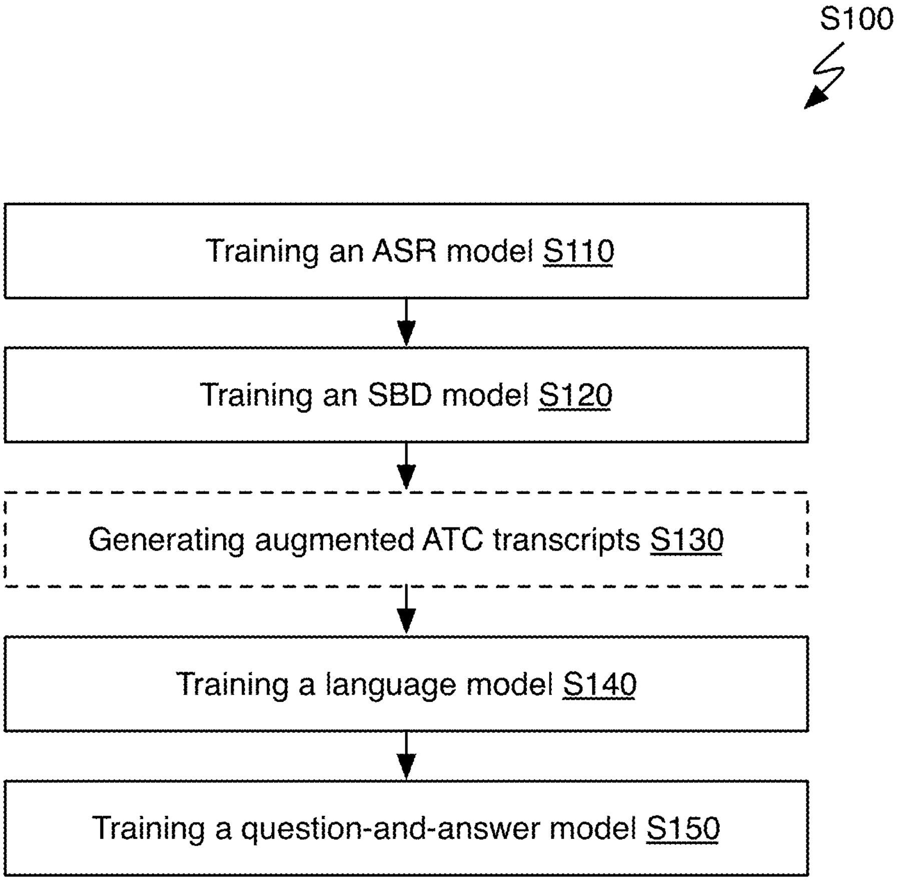
FIG. 9 is a diagrammatic representation of a variant of the method.

Training the system components S100 (example shown in FIG. 9) functions to generate an ATC-tuned system capable of interpreting ATC audio signals into flight commands. S100 can include training a Speech-to-Text model and training a question-and-answer (Q/A) model S150. S100 can optionally include generating augmented ATC transcripts S130. However, training the semantic parser S100 can include any other suitable elements. S100 is preferably performed offline and/or by a remote computing system, but can alternatively be performed onboard the aircraft (e.g., locally, during flight, asynchronously with aircraft flight).

Training the Speech-to-Text model functions to generate a transcription model that is specific to ATC communications, accounting for ATC-specific grammar, lexicon, speech patterns, and other idiosyncrasies. Training the Speech-to-Text model can include training an ASR model S110, training an SBD model S120, training a language model S140, and/or any other suitable elements. Training can include: tuning the network weights, determining weights de novo, and/or otherwise training the network. Training (and/or inference) can leverage: gradient-based methods (e.g., stochastic gradient descent), belief propagation (e.g., sum-product message passing; max product message passing, etc.), and/or any other suitable training method.

Figure 4:
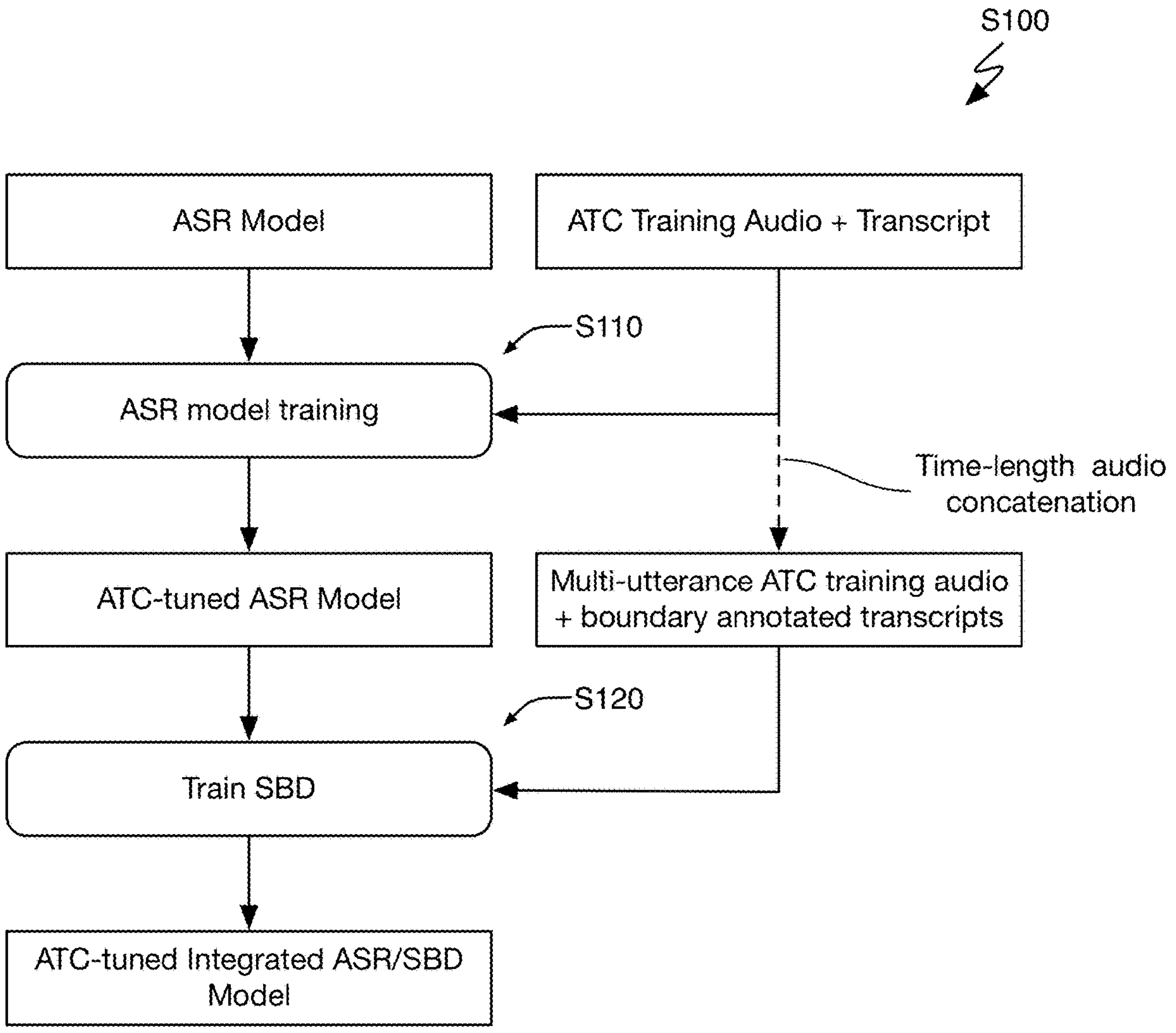
FIG. 4 is a diagrammatic representation of an example of training an ASR model in a variant of the method.

Training an automatic speech recognition (ASR) module S110 functions to train a neural network to recognize natural language in ATC communications. The ASR model is preferably trained (e.g., using supervised training, semi-supervised training) from a pre-existing ASR model (e.g., Wav2Letter), and can be 'tuned' by providing the neural network a mix (e.g., 50/50, 60/40, 70/30, predetermined mix, 100/0, etc.) of ATC training audio with corresponding ATC transcripts and the original training data (e.g., from the pre-existing model). An example is shown in FIG. 4. The ATC training audio with transcripts is preferably manually determined (e.g., by a human, by a domain expert), but can be verified/audited ATC communication audio/transcripts (e.g., generated from an existing ASR model), and/or otherwise determined. The ATC training audio can include a single utterance, multiple utterances, a stream of radio communication over an ATC communications channel, and/or any other suitable training audio. Preferably, utterances (e.g., statements from an individual speaker, sentences, etc.) are individually associated with a transcript as part of the training data. However, the ASR model can be otherwise trained for ATC speech recognition.

Training a sentence boundary detection (SBD) module S120 functions to train the Speech-to-Text module to identify utterance boundaries (e.g., sentence segment boundaries, sentence boundaries). S120 can optionally train the Speech-to-Text module to differentiate unique utterances and/or utterances from different speakers/entities. S120 can train an existing ASR model (e.g., as determined in S110, which generates an integrated ASR/SBD model) or a separate model to generate the SBD module. Preferably, the SBD model can be trained using time-length concatenated audio, which includes a series of multiple utterances and periods of silence (e.g., periods of no speaking) therebetween, and the associated multi-utterance training transcripts. The ATC audio and transcripts used to train the SBD model can be the same as the ASR model and/or different from the ASR model.

Multi-utterance training transcripts preferably include boundary annotations (e.g., with a unique boundary character or other identifier; using a '/' or '%' character; etc.) which can delineate unique speakers, unique utterances, breaks between utterances, periods of silence, audio artifacts (e.g., the "squelch" when the ATC speaker starts and/or starts broadcasting), and/or any other appropriate boundaries. Boundary annotations are preferably automatically added during transcript concatenation, but can be inserted manually, be determined from the audio, and/or otherwise added.

In a specific example, the ASR model is trained by assigning a unique 'silence speaker' and/or a unique 'transition speaker' in the audio and/or transcript-which can be particularly advantageous in SBD for ATC radio communications, commonly exhibit a characteristic radio "squelch" sound prior to an utterance. By assigning these segments of audio to a unique 'transition speaker' (or a 'squelch speaker') the SBD model can more accurately differentiate between back-to-back utterances (e.g., with minimal intervening silence), which commonly occurs in noisy ATC radio channels.

However, an SBD model can be otherwise trained.

Training a language model S140 functions to train a language model to distinguish ATC linguistic patterns. In variants, the language model can determine whether a transcript is contextually correct/logical (e.g., syntactically correct, based on ATC grammar, etc.), determine a language/syntax score for a transcript, and/or otherwise determine whether a transcript makes sense. Preferably, S140 tunes a pre-existing language model (e.g., convolutional neural network, FairSeq ConvLM, etc.), but can alternately train an untrained language model. An existing language model can be tuned based on ATC transcripts, which can be single utterance ATC transcripts, multi-utterance ATC transcripts, and/or boundary annotated ATC transcripts (e.g., such as those used to train the SBD model in S120), however the language model can be trained using any suitable ATC transcripts. S140 preferably does not train on the ATC audio, but can alternatively train on the ATC audio. In variants, the language model can be trained using entity-tagged ATC transcripts, which identify ATC specific entities within the transcript. Tagged entities can include: carriers, aircraft, waypoints, airports, numbers, directions, and/or any other suitable entities. Entity tags can be assigned manually, automatically (e.g., unsupervised), with a semi-supervised HMM tagger (e.g., using a domain expert evaluation tool, etc.), and/or in any other suitable manner. A single word or phrase appearing in a transcript can be assigned to multiple entities depending on the context in which it appears (i.e., the entity tag lexicon can include multiple phonetically and/or lexicographically conflicting entities which are pronounced and/or spelled substantially identically). In an example, "Southwest" can be tagged as (and/or communicate) a direction or a carrier depending on the context in which it appears. Likewise, in a second example, "delta" can be tagged as part of an aircraft name (e.g., DAL456="delta alpha lima four five six"), a carrier, and/or untagged (e.g., referring to a change in value or parameter) depending on the context in which it appears. In a third example, "Lima" can be an airport, a waypoint, part of an aircraft name, and/or otherwise tagged. In a fourth example, waypoints can be pronounced substantially identically (e.g., "ocean") while corresponding to different waypoint entities depending on the context in which they appear. However, the language model can be trained with any other suitable transcripts and/or information.

In variants, a portion of the training text provided to train the language model is the same as that used to originally train the pre-existing language model (e.g., FairSeq ConvLM). Accordingly, the language model can be 'tuned' by providing the neural network a mix (e.g., 50/50, 60/40, 70/30, predetermined mix, etc.) of ATC training transcripts and the original training data (e.g., from the pre-existing model). However, a language model can be otherwise trained for ATC linguistic patterns.

Figure 5:
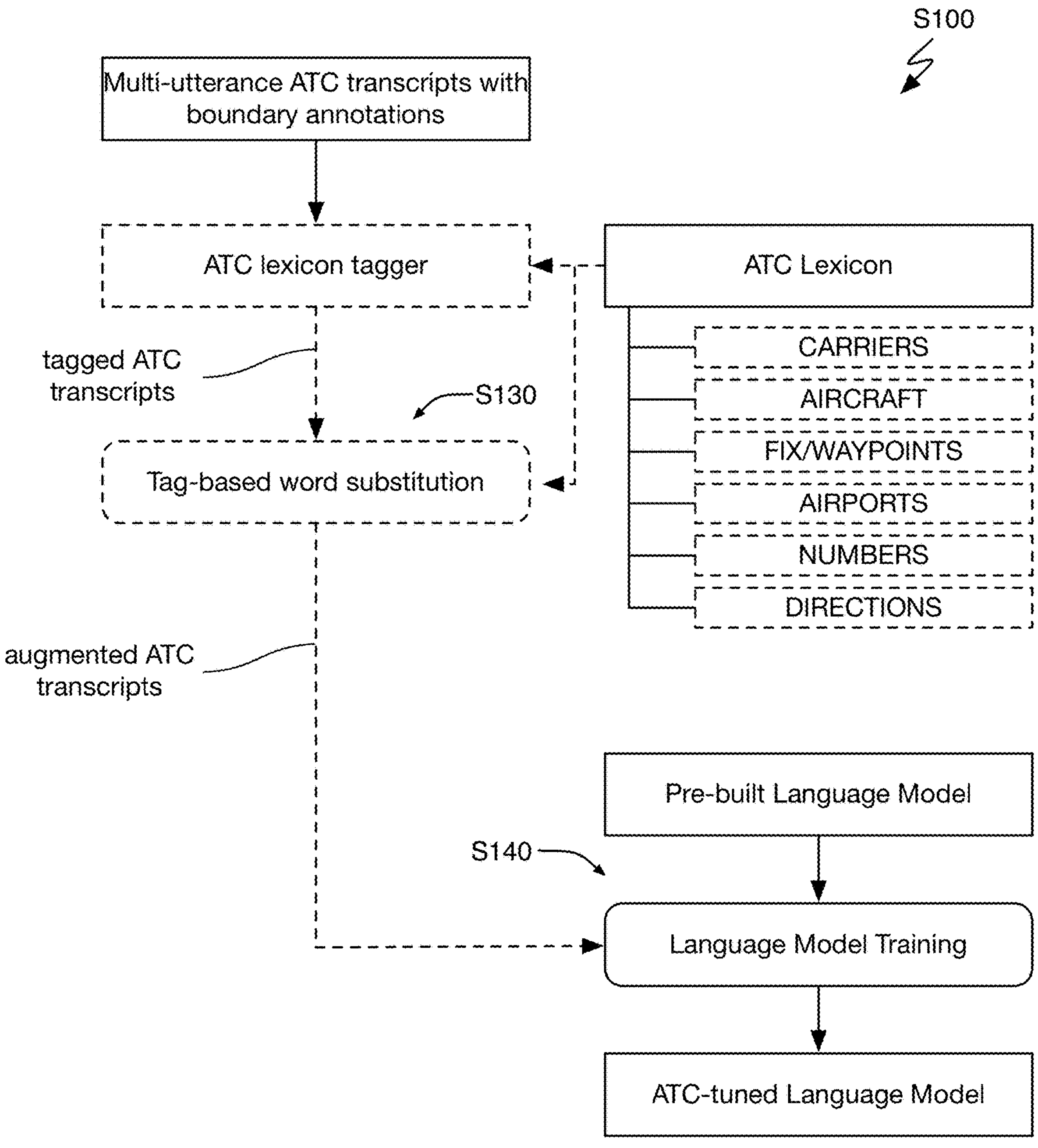
FIG. 5 is a diagrammatic representation of an example of training a language model in a variant of the method.

S100 can optionally include generating augmented ATC transcripts S130 (e.g., synthetic transcripts), which functions to expand the number/quantity of ATC training transcripts available to train the language model in S140, an example of which is shown in FIG. 5. In variants, this can be beneficial in order to provide training transcripts specific to areas/regions where entities are known (e.g., airport names, waypoints, carriers, etc.), but from which ATC transcripts are unavailable. Additionally or alternately, S130 can improve the accuracy of the language model by increasing a size of the training dataset (e.g., number of available utterance transcripts). S130 preferably substitutes the values of tagged entities (e.g., within the entity-tagged ATC transcripts) with different entity values from an ATC entity lexicon. The ATC entity lexicon can be manually generated, generated by a domain expert (e.g., pilot), randomly generated (e.g., number substitution), generated using: historical flight logs, aircraft databases, airport databases, randomly generated, and/or otherwise generated. In variants, the augmented ATC transcripts can preferentially (e.g., at a higher rate; with greater frequency; occurring with greater than a threshold number of instances-such as 3 or more within the training set) substitute phonetically and/or lexicographically conflicting entity names (e.g., which are identified by multiple tags in different contexts), such as "southwest" and "delta." The augmented ATC transcripts can then be used to train the language model in S140 and/or question-and-answer model in S150 (e.g., an example of training an ATC-tuned language model is shown in FIG. 5).

However, ATC transcripts can be otherwise generated. Alternatively, the semantic parsing system (and/or neural network models therein) can be trained entirely with real ATC communication transcripts.

S100 can include training a question-and-answer (Q/A) module S150, which functions to train a model to answer ATC-specific queries. S150 preferably includes tuning a pre-trained language model, but can include training an untrained model. The language model can be trained using: an ATC transcript, the associated parsed meaning (e.g., reference outputs; answers to the queries; values for command parameters determined from the ATC transcript, etc.), the set of command queries, and/or other data. In variants, S150 can also provide the language model contextual information pertaining to a particular utterance-such as a tail number or carrier for a particular aircraft, a flight plan for the aircraft, a set of utterance transcripts preceding the particular utterance, and/or any other suitable contextual information.

The text transcripts used to train the Q/A model can be the same ATC transcripts used to train the ASR and/or SBD model, the same ATC transcripts (and/or augmented ATC transcripts) used to train the language model, the utterance hypotheses output by the Speech-to-Text module, and/or other transcripts. However, the Q/A model can be trained using any suitable ATC transcripts.

Figure 6:
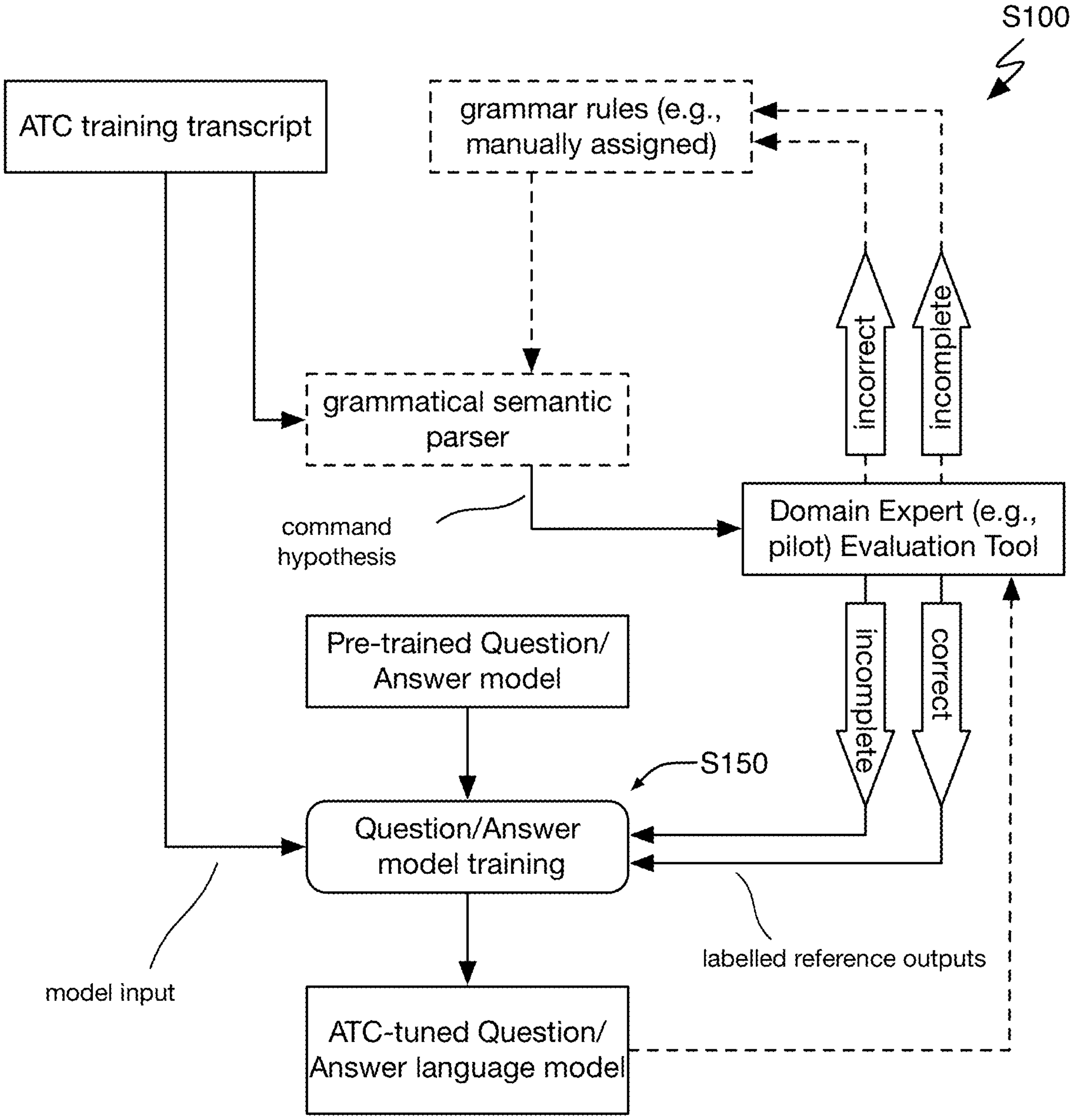
FIG. 6 is a diagrammatic representation of an example of training a Question/Answer model in a variant of the method.

The parsed meaning used to train the Q/A model can be: manually determined, manually audited by a domain expert, provided by a grammatical semantic parser (e.g., SEMPRE, a lower-accuracy parser than the system, a previous iteration of the system, etc.; an example is shown in FIG. 6) referencing ATC grammar (e.g., manually determined, iteratively determined, learned, etc.), and/or otherwise suitably determined.

In a specific example, a grammatical semantic parser parses the command parameter values from the ATC transcripts, wherein the parsed values (e.g., command hypotheses), source transcript, optionally ATC audio, and/or other data are presented on a domain evaluation tool (an example is shown in FIG. 8) to domain experts. The domain expert can: label to the model output (e.g., as "correct," "incomplete," "incorrect," etc.), correct the parsed values, and/or otherwise interact with the parser output. In variants, reference outputs labelled as "incorrect" and/or "incomplete" can be reviewed and used to update or improve grammar rules of a grammatical semantic parser. In variants, reference outputs labelled "incorrect" are not used to train the Q/A model, but can alternately be used to train the Q/A model (e.g., the "incorrect" label serving to train by counterexample). In variants, reference outputs which are labelled as "correct" and/or "incomplete" can be passed into the Q/A model during S150. In variants, incomplete label data can be used to train a subset of queries associated with a particular utterance (e.g., based on the correctly labelled portions of the transcript). As an example, where the parameter values may be unlabelled and the topics are identified, the topics may be used to train a command identification (e.g., "topics?") query. Likewise, where the aircraft tail number is tagged/identified, incomplete label data can be used to train the plane-specific speaker identification query (ies). However, the labels can be otherwise used, and model outputs can be otherwise suitably determined.

However, a question-and-answer model can be otherwise suitably trained.

In variants, the ASR model, SBD model, language model, and/or Q/A model can be optionally retrained and/or updated based on pilot/PIC validation with any suitable update frequency. The models can be updated/retrained independently, synchronously, asynchronously, periodically (e.g., with a common update frequency, with different frequencies), never (e.g., which may be desirable in instances where the deterministic model(s) are certified), based on auditing of the intermediate outputs, and/or can be otherwise suitably updated or trained. The models can be updated locally, onboard the aircraft, periodically via remote/cloud (push) updates, and/or can be otherwise suitably updated/retrained.

In variants, the model(s) can be audited based on a pilot rejection of the final output parameters in order to locate error origin(s) within the data pipeline (e.g., as part of a root cause analysis), which can be used as a training input to improve the network. As an example: an erroneous intermediate parameter (such as in the utterance hypothesis or linguistic hypothesis) can result in an incorrect output of the Q/A module even in cases where the Q/A module performs correctly. In variants, the outputs of each model/module can additionally be audited against a formatting template prescribed to each step (e.g., to enable certification compliance of the system). However, the system and/or various subcomponents can be otherwise suitably audited.

However, the system components can be otherwise suitable trained.

4.2 Runtime/Inference

S200 can include: at an aircraft, receiving an audio utterance from air traffic control S210, converting the audio utterance into a predetermined format S215, determining commands using a question-and-answer model S240, and controlling the aircraft based on the commands S250. However, the method S200 can additionally or alternatively include any other suitable elements. S200 functions to automatically interpret flight commands from the air traffic control (ATC) stream. The flight commands can be automatically used to control aircraft flight; presented to a user (e.g., pilot, a remote teleoperator); relayed to an auto-pilot system in response to a user (e.g., pilot) confirmation; and/or otherwise used.

All or portions of S200 can be performed continuously, periodically, sporadically, in response to transmission of a radio receipt, during aircraft flight, in preparation for and/or following flight, at all times, and/or with any other timing. S200 can be performed in real- or near-real time, or asynchronously with aircraft flight or audio utterance receipt. S200 is preferably performed onboard the aircraft, but can alternatively be partially or entirely performed remotely.

Receiving an audio utterance from air traffic control S210 functions to receive a communication signal at the aircraft and/or convert the communication signal into an audio input, which can be processed by the ASR module. In a specific example, S210 transforms an analog radio signal into a digital signal using an A/D converter (and/or other suitable wireless communication chipset), and sends the digital signal to the ASR module (e.g., via a wired connection) as the audio input. S210 preferably monitors a single radio channel (e.g., associated with the particular aircraft), but can alternately sweep multiple channels (e.g., to gather larger amounts of ATC audio data). However, S210 can otherwise suitably receive an utterance.

Converting the audio utterance into a predetermined format S215 functions to generate a transcript from the ATC audio. This can be performed by the Speech-to-Text module or other system component. Converting the audio utterance to into a predetermined (e.g., text) format can include: determining a set of utterance hypotheses for an utterance S220 and selecting an utterance hypothesis from the set of utterance hypotheses S230; however, the ATC audio can be otherwise converted.

Determining a set of utterance hypotheses for an utterance S220 functions to identify audio patterns (e.g., such as letters, phonemes, words, short phrases, etc.) within the utterance. In a specific example, S220 can be performed by the Speech-to-Text module, an ASR module (and/or ASR model therein), an integrated ASR/SBD module (e.g., with an integrated ASR/SBD model therein), a language module, and/or combinations thereof. S220 can optionally include assigning a weight or score to each audio pattern (a.k.a. linguistic hypothesis) using the ASR module and/or other modules. An utterance hypothesis can be: a linguistic hypothesis, a series of linguistic hypotheses, and/or any other suitable hypothesis.

In a first variation, an ASR and/or integrated SBD/ASR module generates a set of linguistic hypotheses, wherein a language module receives the linguistic hypotheses and generates a score (e.g., ASR score; same or different from language weight/score) for each string or sequence of linguistic hypotheses. One or more linguistic hypothesis sets can be generated from the same audio clip. The SBD/ASR module can also output a score (ASR score or ASR weight) for each linguistic hypothesis, sequence of hypotheses, and/or set of linguistic hypotheses. However, the set of utterance hypotheses can be otherwise determined.

Selecting an utterance hypothesis from the set of utterance hypotheses S230 functions to detect language patterns from the set of linguistic hypotheses in the context of the entire utterance. Additionally or alternately, S230 can function to select the highest probability string/sequence of linguistic hypotheses as the utterance hypothesis. S230 can be performed by the language module, the Q/A module, and/or another module.

In a first variation, the language module can select the string or sequence of linguistic hypotheses which has the highest combined language weight (or score) and ASR weight (or score) as the utterance hypothesis.

In a second variation, multiple modules' outputs are cooperatively used to select the utterance hypothesis. For example, the utterance hypothesis with the highest combined hypothesis score and/or maximum hypothesis weight cooperatively determined by the language model and the integrated ASR/SBD model is selected. In a first example, the utterance hypothesis which maximizes the language weight multiplied by the ASR weight for an utterance is selected. In a second example, the hypothesis which maximizes the sum of the language score and the ASR score for an utterance.

However, the utterance hypothesis can be otherwise selected.

Determining commands from the utterance hypothesis using a question-and-answer model S240 functions to extract flight commands from the utterance hypothesis, which can be interpreted and/or implemented by a flight processing system. S240 is preferably performed by one or more instances of the Q/A module, but can be performed by another component. S240 is preferably performed using the set of flight command queries and the utterance hypothesis, but can be otherwise performed.

S240 can include providing the Q/A module with a set of command queries in addition to the utterance hypothesis as an input, wherein the Q/A module answers the command queries using the utterance hypothesis as a reference text. In a first embodiment, the queries are provided serially, wherein the successive query is determined based on the prior answer. The query series can be determined from the command query set structure (e.g., list, tree, etc.), randomly determined, or otherwise determined. In a specific example, S240 includes querying for topic presence within the utterance hypothesis, then only querying for values for the topics confirmed to be within the utterance. In a second specific example, S240 includes initially determines if the aircraft (and/or pilot) is the intended recipient of the utterance (associated with the utterance hypothesis), and only querying further if the utterances are intended for the aircraft/pilot (e.g., utterances not intended for the aircraft/pilot are ignored and/or any commands therein are not passed to the flight processing system; utterances corresponding to a transition speaker detections can be neglected; etc.). Alternatively, the Q/A model (or different versions or instances thereof) can be queried with multiple queries in parallel or can be otherwise queried.

In a second variant, the Q/A module includes pre-embedded queries, wherein the Q/A module answers a predetermined set of questions based on the utterance hypothesis. For example, the Q/A module can be a multi-class classifier that outputs values, determined from the utterance hypothesis, for each of a set of "classes," wherein each class represents a command parameter. However, S240 can otherwise suitably determine command parameter values.

In some variants, the Q/A module can be further utilized (e.g., by S240 or a similar process) to determine: flight changes, traffic advisories, and/or any other suitable ATC communications/instructions (e.g., where the aircraft is the intended recipient or otherwise). For example, S240 can additionally or alternatively determine traffic advisories, traffic alerts, ATC instructions/directions, and/or any other suitable instructions.

However, commands and/or other instructions for the aircraft can be otherwise suitably determined using the Q/A model.

S200 can optionally include controlling the aircraft based on the commands S250, which functions to modify the aircraft state according to the utterance (e.g., ATC directives). In a specific example, S250 autonomously controls the effectors and/or propulsion systems of the aircraft according to the commands (e.g., to achieve the commanded values). In a second example, the flight processing system can change waypoints and/or autopilot inputs based on the commands. In variants, S200 can include providing the commands to a flight processing system (e.g., FCS) in a standardized format (e.g., a standardized machine-readable format).

However, S250 can otherwise suitably control the aircraft based on the commands. Alternatively, the system can be used entirely in an assistive capacity (e.g., without passing commands to an aircraft processor or controlling the aircraft, such as to enable control of an aircraft by a hearing-impaired pilot), and/or can be otherwise used. However, S200 can include any other suitable elements.

5. Directed Perception

5.1 System

The collision avoidance system 200, an example of which is shown in FIG. 14, can include: a traffic detection module 210, an avoidance module 220, and/or any other suitable components. The collision avoidance system can function to facilitate detection of objects (e.g., traffic obstacles, other aircraft, etc.) and/or determination of resolution advisories (e.g., via input from a collision avoidance system, such as TCAS or ACAS, and/or autonomous trajectory planning) to avoid aircraft collisions with objects. In variants (e.g., an example is shown in FIG. 15), collision avoidance system 200 (and/or the traffic detection module and/or the collision avoidance module thereof) can be integrated into the lower assurance system and/or as a computing module of the autonomous computing system as described in U.S. application Ser. No. 17/891,845, filed 19 Aug. 2022, which is incorporated herein in its entirety by this reference.

The collision avoidance system 200 can receive inputs from the aircraft sensor suite and/or perception sensors thereof (e.g., camera, Radar, Lidar, time-of-flight sensors, etc.). The (onboard) aircraft sensor suite can include one or more: time-of-flight sensors (e.g., radar, LIDAR, time-of-flight camera, etc.), radar sensors (e.g., radar altimeter, etc.), LIDAR sensors, sonar sensors, cameras (e.g., RGB, CCD, CMOS, multispectral, visual range, hyperspectral, infrared, stereoscopic, etc.), wave-based sensors (e.g., light waves, sound waves, etc.), light-based sensors (e.g., cameras, visual spectrum, IR spectrum, radio-frequency spectrum, etc.), spatial sensors (e.g., inertial measurement sensors, IMU, INS, accelerometer, gyroscope, altimeter, magnetometer, AHRS, compass, etc.), location sensors (e.g., GPS, GNSS, triangulation, trilateration, etc.), air data sensors (e.g., airspeed, pressure, temperature, etc.), force sensors, vibration sensors, and/or any other suitable set of sensors. Additionally, the collision avoidance system 200 can receive traffic advisories and/or other commands, advisories, alerts, or other information from the semantic parsing system 100. For example, the semantic parsing system can provide traffic advisories (or traffic alerts) which can be used to direct perception via the collision avoidance system 200 (e.g., in accordance with S300). Additionally, the collision avoidance system can optionally receive inputs from auxiliary data sources 230, which can include: historical flight information (e.g., flight logs, tracking data, aggregate routing information, aggregate traffic information, flight traffic heatmaps, etc.), transponder data (e.g., Mode C and Mode S transponders; TCAS, ACAS, etc.), TCAS data, ACAS data, ADS-B data (e.g., from an onboard ADS-B system), ground-based aircraft tracking data (e.g., from ground-based radar/localization), and/or any other suitable datasets. In variants, historical flight information can be accessed from public databases and/or stored locally onboard the aircraft (e.g., in conjunction with a flight plan, prior to departure, etc.). As an example, historical flight information and/or other auxiliary data can be stored onboard the aircraft (e.g., in conjunction with a flight plan or otherwise) in conjunction with the system and/or methods as described in U.S. application Ser. No. 17/674,518, filed 17 Feb. 2022, which is incorporated herein in its entirety by this reference.

However, the collision avoidance system can receive any other suitable set of data/inputs from any other aircraft systems or data sources.

The collision avoidance system can include a traffic detection module 210 which functions to detect traffic using data from the perception sensors. As an example, the traffic detection module can execute Block S320 of the directed perception method.

The traffic detection module can include one or more: pretrained object detector (e.g., pretrained for a specific class of aircraft, detection range, etc.), neural network (e.g., CNN, R-CNN, FCN, YOLO, etc.), graphical model (e.g., Bayesian network), a logistic regression, clustering algorithms, feature detectors (e.g., ORB, SIFT, etc.), histogram of gradients (HOG), single shot detector (SSD), spatial pyramid pooling (SPP-net), and/or any other suitable object detector(s). In variants, the object detector can include a classifier (e.g., binary classifier, multiclass classifier, etc.) and/or can function to classify detected objects. The object detector can include: an integrated object detector/classifier, a binary classifier, a multi-class classifier, a clustering model (e.g., hierarchical clustering model), a regression model, a neural network model (e.g., R-CNN, DNN, CNN, RNN, etc.), a cascade of neural networks, an ensemble of neural networks, compositional networks, Bayesian networks, Markov chains, predetermined rules, probability distributions, heuristics, probabilistic graphical models, and/or other model(s). However, the object detector can include any other suitable model(s).

In variants, the traffic detection module can perform continuous traffic detection (e.g., in conjunction with a continuous/persistent collision avoidance routine) and/or can continuously search for objects (or obstacles) in the surrounding airspace environment using a stream of perception data from the aircraft sensor suite (and/or perception sensors thereof). For example, a collision avoidance routine (e.g., close range, such as less than 2 nautical miles, etc.) can be performed in substantially real-time using the vehicle perception data based on a coarse analysis of the aircraft perception data (e.g., downsampling images, binned images, lower resolution search, closer range search, search for larger apparent objects, etc.; lower resolution point cloud, etc.). In variants, the traffic detection module can additionally or alternatively facilitate directed perception/searches based on inputs received from the semantic parsing system (e.g., traffic advisories) and/or auxiliary data sources 230 (e.g., ADS-B data, historical traffic information, etc.). For example, directed perception/searches can be performed discretely, such as in response to an ATC request (e.g., traffic advisory; request for identification of an aircraft in proximity), a pilot request (e.g., via a pilot validation interface, such as a pilot communicating an ATC traffic advisory and/or manually providing request, etc.), and/or with any other frequency/timing. As an example, the traffic detection system can perform (extended-range) directed perception contemporaneously with a closer-range collision avoidance routine (e.g., and/or closer range traffic detection routine thereof), wherein the closer-range collision avoidance routine is performed in substantially real-time using the vehicle perception data and is based on a coarser analysis of the vehicle perception data than the directed object detection routine search.

In variants, the traffic detection routine can be performed: continuously, discontinuously, discretely, in response to a determination of a traffic advisory (e.g., via the semantic parsing system 100), in response to an operator request (e.g., ATC communication, pilot input, remote operator, etc.), once (e.g., searching for a particular aircraft/object), periodically, aperiodically, repeatedly, in response to satisfaction of a trigger condition, contemporaneously with another collision avoidance routine (e.g., extended-range traffic detection and/or collision avoidance can occur contemporaneously with close-range traffic detection and/or collision avoidance), and/or with any other suitable frequency/timing.

In some variants, perception data (e.g., camera images; point clouds; etc.) can be prefiltered and/or preprocessed to eliminate distorted and/or saturated regions of perception data. For example, saturated pixels (e.g., washed out due to sunlight, etc.) can be masked, filtered-out of the image and/or otherwise neglected from consideration during object detection/classification, which may be useful when objects are large relative to pixel resolution and/or when perception data is downsampled (e.g., during closer range object detection), to improve the quality of image data. Additionally or alternatively, saturated pixels can be used to direct and/or seed extended range searches (e.g., such as by incorporating saturated pixels into heuristic or tree-based searches/classification), and/or otherwise used by extended-range object detection/classification. For example, the 'glint' of sunlight reflecting from a windscreen or piece of metal may be a distinct indicator of the presence of a distant aircraft. As the apparent size of an adjacent aircraft grows small (e.g., which is particularly relevant for extended range detection; such as between 2 and 5 nautical miles), the sunlight glint and the corresponding pixel saturation may be a strong (est) indicator of aircraft presence. Thus, variants can advantageously direct extended-range searches by including these pixels and/or directing traffic (object) detection within the surrounding region of pixels (and corresponding airspace). However, perception data can be otherwise filtered/processed as a part of object detection/classification.

The traffic detection module can output: object (traffic) detections/identifications (e.g., geospatial location; ego-relative position; bounding box; etc.), an object identifiers (e.g., aircraft tail number, instance ID), an object class (e.g., type of aircraft; type of object; size of aircraft; etc.), a probability (e.g., identification confidence; classification probability; etc.), and/or any other suitable object/traffic information.

However, the collision avoidance system can include any other suitable traffic detection module.

The collision avoidance system 200 can include an avoidance module 220, which functions to resolve potential collision conflicts. Additionally or alternatively, the avoidance module can enable determination of resolution advisories. Additionally or alternatively, the avoidance module can facilitate aircraft navigation based on traffic detections (and/or failure to detect adjacent aircraft) by the traffic detection module 210. The avoidance module preferably receives outputs (e.g., traffic detections) from the traffic detection module 210 and acts to resolve potential collision conflicts (i.e., avoid collisions) based on the outputs from the traffic detection module. Additionally, the avoidance module can receive outputs from the semantic parsing system (e.g., aircraft advisories, commands, traffic advisories, etc.) to facilitate routing and collision avoidance. The collision avoidance module can include: a classically programmed collision avoidance model(s), a ML model (e.g., neural networks, etc.), heuristic model, a tree-based model, and/or can facilitate collision avoidance by a set of predetermined rules, heuristics, or other techniques. The collision avoidance module can respond by performing (or directing) one or more actions in accordance with Block S330, and/or can otherwise facilitate collision avoidance.

In some variants, the avoidance module can facilitate tracking of traffic (e.g., in the immediate airspace, which may facilitate in aircraft routing and collision avoidance; via an object tracking sub-module) and/or can operate without object (traffic) tracking (e.g., in cases where observing an aircraft proximal to an expected position may be sufficient to avoid a collision, such as at the request of ATC; where the traffic detection can perform object tracking, etc.).

In a first set of variants, the avoidance module can include an autonomous navigation/routing engine which can autonomously determine resolution advisories based on the traffic detections, wherein the resolution advisories can be validated by a pilot (e.g., via a pilot validation interface). In a second set of variants, the avoidance module can facilitate automated audio requests for collision avoidance guidance (e.g., via the system 100 and/or an ATC radio), wherein ATC may redirect the aircraft to avoid a potential collision. In a third set of variants, the avoidance module can direct pilot intervention.

However, the collision avoidance system 200 can include any other avoidance module(s); and/or the collision avoidance system can be otherwise configured.

5.2 Method

Figure 16:
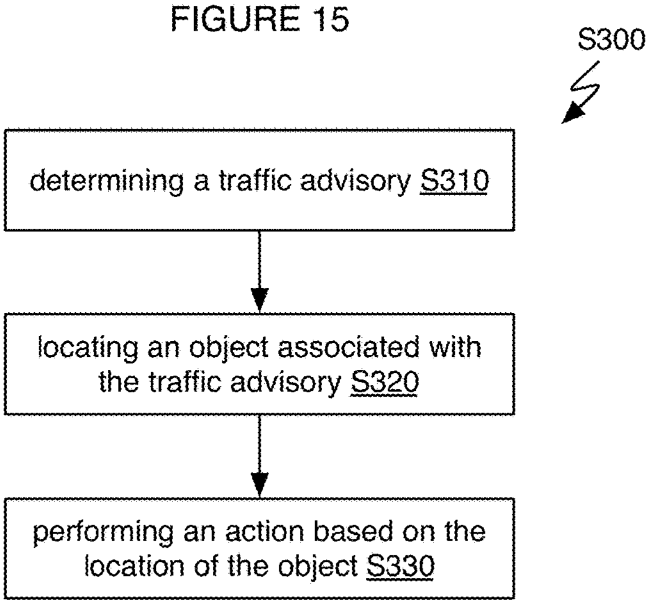
FIG. 16 is a diagrammatic flow chart representation of a variant of the method.

The method S300 for directed perception, an example of which is shown in FIG. 16, can include determining a traffic advisory S310, locating an object associated with the traffic advisory S320, and performing an action based on the location of the object S330. The method functions to automatically facilitate directed perception based on traffic advisories (e.g., via interpret communications from a stream of ATC radio communications). The method can additionally or alternatively function to facilitate autonomous and/or automatic detection of objects (e.g., other aircraft) based on ATC communications. However, the method S300 can otherwise facilitate directed perception.

Figure 17:
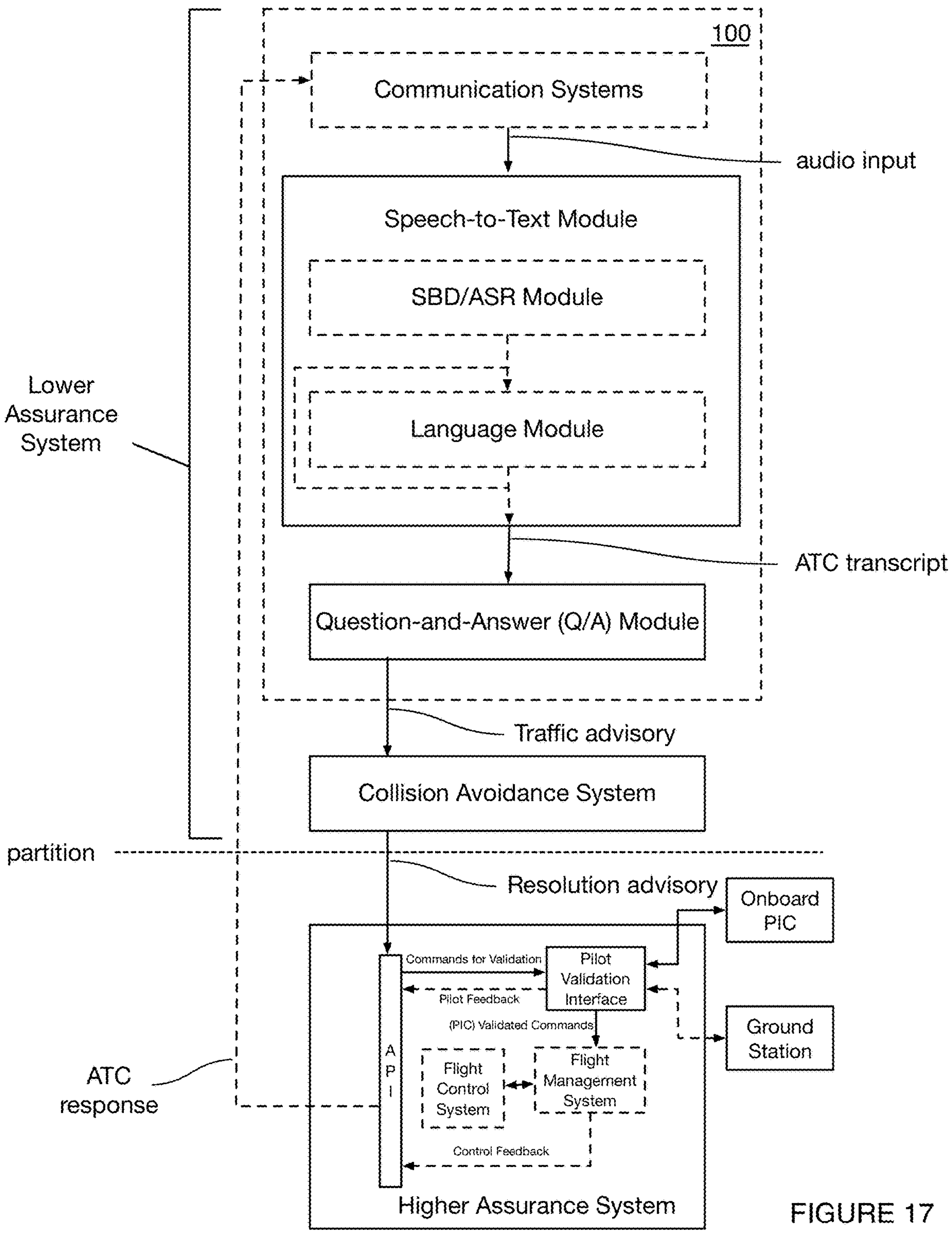
FIG. 17 is a schematic representation of a variant of the system.

Determining a traffic advisory S310 functions to determine a traffic advisory based on ATC communications (e.g., an example is shown in FIG. 17). For example, semantic parsing of an ATC audio input (and/or an utterance hypothesis derived thereof) via the semantic parsing system 100 can be used to determine a traffic advisory, wherein the ego aircraft is the intended recipient (e.g., based on an ego call sign and/or tail number). In such cases, the ATC audio may be associated with an air traffic controller alerting the aircraft to the presence of an object (e.g., aircraft, large tower/bridge, etc.) and/or requesting that the ego aircraft confirm a visual on the adjacent object. Traffic advisories preferably refer to other aircraft, but can reference any suitable objects or visual references (e.g., terrain features, etc.).

S310 is preferably performed using the semantic parsing system 100 and/or by executing all or a portion of S200. Additionally or alternatively, S310 can include or be based on: validation of the advisory (e.g., by an pilot onboard the ego aircraft, by a remote operator, etc.), pilot inputs (e.g., via a pilot validation interface), and/or any other suitable information/inputs.

The traffic advisory (and/or information output from the semantic parsing system 100, as derived from the radio utterance) can include object information, such as: an object identifier (e.g., aircraft tail number, call sign, etc.; a proper noun/name such as "Needham Towers" or "Air Force One"), an object class (e.g., bridge, aircraft type, etc.), a position estimate (e.g., position information such as an Earth referenced position estimate, ego-relative position estimate, altitude estimate, ego-relative altitude estimate, ego-relative heading position; "eleven o'clock, two-thousand feet above"), object movement information (e.g., absolute or relative heading, speed, airspeed, etc.) and/or any other suitable object information.

In a first variant, S310 can include: receiving an audio signal; determining an utterance hypothesis for the audio signal; and autonomously determining a traffic alert based on the utterance hypothesis.

In a second variant, nonexclusive with the first, S310 can include: receiving an air traffic control (ATC) audio signal from a communication system; determining an utterance hypothesis from the ATC audio signal with automatic speech recognition (ASR); autonomously determining a traffic advisory by querying the utterance hypothesis with a pre-trained neural network model based on the utterance hypothesis, the traffic advisory comprising an estimated ego-relative position of an object. As an example, determining the utterance hypothesis from the ATC audio signal can include: with the integrated ASR and sentence boundary detection (SBD) module, generating a set of linguistic hypotheses based on the ATC audio signal; using an ATC-tuned language model, determining a respective language score for each linguistic hypothesis of the set of linguistic hypotheses; and determining the utterance hypothesis from the set of the linguistic hypotheses based on the respective language scores.

However, the traffic advisories can be otherwise suitably determined.

Locating an object associated with the traffic advisory S320 functions to detect, identify, and/or determine a location (i.e., confirm a position estimate, within threshold accuracy) of traffic, such as nearby aircraft, to facilitate aircraft routing and collision avoidance. S320 is preferably performed with perception data collected onboard the aircraft (e.g., via sensor suite and/or perception sensors thereof; LIDAR point clouds, camera images, radar data cubes, etc.), but can additionally utilize auxiliary data sources and/or any other suitable data. S320 is preferably performed by the collision avoidance system and/or a traffic detection module thereof, but can be otherwise suitably executed with any other aircraft (sub-) systems.

In one set of variants, the collision avoidance system can perform substantially continuous object detection/tracking (e.g., close range detection/tracking; within 2 nautical miles) across surrounding airspace. For example, a collision avoidance system can perform real-time (or near real time) traffic detection/avoidance with a coarse analysis of perception data (e.g., down-sampled data; fast object detection model which utilizes less compute, etc.). Additionally or alternatively, persistent object detection/tracking can be used to validate ADS-B position estimates, and/or fused with ADS-B (and/or other auxiliary data) to provide persistent position estimates for a set of aircraft and/or object in the surrounding airspace (e.g., and/or nearby planned flightpath) . In such variants, in cases where the object has already been, and/or is currently, detected/tracked, the object location can be referenced from a prior (e.g., current and/or historical tracking data, such as referenced from recent detection/tracking across the last 10 seconds, last 30 seconds, etc.; based on ADS-B estimate which has been validated for accuracy within the last minute, etc.) in S320. As an example, S320 can locate a nearby aircraft by referencing a prior. However, in cases where no prior exists for an aircraft and/or where the estimated aircraft position is beyond the detection range of real-time object detection/tracking systems, S320 and/or the traffic detection system may trigger an extended range search (e.g., contemporaneous and/or asynchronously with real-time traffic detection, tracking, and/or collision avoidance).

In a second set of variants, nonexclusive with the first set of variants, S320 can direct object/traffic detection based on the traffic advisory. More preferably. S320 can direct object/traffic detection based on the object information associated with the traffic advisory. As an example, S320 can trigger a (directed) object/traffic detection routine (i.e., perception-based search) in response to the (automatic/autonomous) determination of the traffic advisory.

Directing object/traffic detection based on the object information can include one or more of: providing the object information (e.g., ego-relative position; aircraft class; etc.) as inputs to a pretrained object detector/classifier, selecting a pretrained object detector from a plurality of object detectors based on the object class (e.g., wherein each object detector of the plurality is pretrained to detect a respective object class; for example a first object detector can be pretrained to detect Boeing 737s and a second object detector can be pretrained to detect light aircrafts, such as a Cessna 172; etc.), restricting a search space based on the object information (e.g., restricting an image pixel search space within the set of camera images based on a proximity of the estimated ego-relative position; restricting an azimuthal region of space based on an ego-relative heading and/or estimated nautical distance; restricting a zenith angle range of search space based on the altitude and/or range; restricting a range of returns based on an estimated distance to the aircraft), seeding an object detection search based on the object information (e.g., wherein the search focuses/centers around the estimated position or a high probability region estimated based on the object information; where the estimated position can serve as a starting point for an object detection routine; kernel [s] or other techniques to focus convolutions and layers of neural network; biased pixel binning approaches; etc.), estimating an apparent size of the aircraft based on the object information (e.g., using classical programming techniques, ML-based programmatic techniques, etc.; and providing the estimated apparent size of the aircraft as an object/traffic detection input), and/or object/traffic detection can be otherwise based on any other suitable object information. Directed perception in S320 preferably occurs based on granular perception data (e.g., relative to real-time detection; triggering directed imaging with a modified magnification/focal length/lens focus/etc.; at higher/full-resolution; etc.). Additionally, S230 can occur for a current data frame/window (e.g., single image from each of a set of cameras and/or frame of a radar data cube) and/or can include analysis of multiple historical data frames/windows (e.g., optical flow techniques; utilizing historical data to improve detection accuracy, detection likelihood, and/or detection confidence; etc.). However, directed perception can additionally or alternatively be based on auxiliary data (e.g., from auxiliary data sources 230), refined data (e.g., refined perception data; iteratively refined search region, etc.), a subregion of data (e.g., subset of pixels, subset of radar data cube, etc.), current perception data, historical perception data, aircraft data, historical NLP traffic data (e.g., prior utterances, parsed during current flight/mission), and/or any other suitable data/information.

In a first variant, perception-based traffic detection can be directed based on the estimated position of the aircraft by confining/reducing the search space to a data region corresponding to a sector of airspace containing the estimated position.

In a second variant, perception-based traffic detection can be directed based on real-time traffic data from auxiliary data sources (e.g., ADS-B). For example, a perception-based search for a particular aircraft (e.g., as directed by an ATC traffic advisory) can scan a search space which is refined based on the estimated ego-relative position of the aircraft, received from an auxiliary data source such as ADS-B.

In a third variant, perception-based traffic detection can be refined based on historical data, such as historical flight traffic aggregates (e.g., a heatmap of high probability regions of airspace, historical trajectories for the particular flight number or tail number, etc.). For example, if aircraft usually change course or turn around a lighthouse (e.g., as may occur off the coast of Cape Cod), this traffic pattern may be used to further refine the search and/or predict the likely trajectory (or region of airspace) where the aircraft is likely to be present.

In a fourth variant, perception-based traffic detection can be directed based on inter-aircraft communications on the active radio frequency (e.g., in addition to ground ATC). For example, if the aircraft associated with a traffic advisory has referenced terrain features/callouts (X bridge; blue tanks; "Verify that you are visual on the Needham towers"; etc.) in previous radio communications, these may be identified and referenced to direct perception searches.

In some variants, S320 can additionally direct searches based on 'glint' returns. For example, instead of filtering out highly saturated pixels and neglecting them from consideration as object detection inputs, these may be provided to object detectors and/or referenced as indicators of aircraft presence. In variants, traffic detectors can be pretrained to associate 'glint' with the presence of aircraft/objects, and/or data regions surrounding a 'glint' instance may be used to more efficiently direct object detection (e.g., seeding search). As an illustrative example, light reflections off of an aircraft windshield are often the first hint of an aircraft that is identified to another pilot. Accordingly, perception-based traffic detection may further utilize glint and/or pixel saturation to further refine or direct the search space.

S320 preferably identifies and locates aircraft (or another objects) associated with the traffic advisory, and outputs the location and/or confirmation of the detection to facilitate collision avoidance and/or routing. For example, S320 can utilize a pretrained traffic/object detector, such as within the traffic detection module 210, to detect the aircraft associated with the traffic advisory and determine a location of the aircraft, which can be used to direct actions in accordance with S330. Alternatively, in cases where the aircraft cannot be identified/located, and/or where a confidence falls below a predetermined confidence threshold (e.g., classification probability output by an object detector, etc.), the system can output a null location and optionally request pilot and/or ATC intervention (e.g., by way of S330). For example, a pilot may be able to visually confirm the location of an adjacent aircraft and/or may validate that the aircraft/object cannot be identified (e.g., via the pilot validation interface).

In variants, S320 can include 'extended-range' searches and/or traffic detection beyond the range of real-time detection/tracking capabilities in response to traffic advisory determinations according to S310. For example, S320 can include extended-range searches which can be: 1 nautical mile, 2 nautical miles, 3 nautical miles, 4 nautical miles, 5 nautical miles, 7 nautical miles, 10 nautical miles, greater than 10 nautical miles, any open or closed range bounded by the aforementioned values, and/or any other suitable search range. Additionally or alternatively, extended-range searches may utilize a greater granularity of input data (e.g., resolution, refresh rate, optical range, data volume) and/or a proportionally larger amount of processing bandwidth/time (e.g., larger models for object detection/classification, non-generic/class-specific models, etc.). Additionally or alternatively, extended range searches can be discretized/discontinuous (e.g., so as to avoid continuous consuming processing bandwidth) and/or may terminate in response to satisfaction of a trigger condition (e.g., confirmed location of the object with greater than threshold confidence, pilot identification and/or validation of the object location, expiration of a time threshold, receipt of a follow-up request from ATC, etc.). However, S320 can otherwise facilitate extended range traffic detection and/or extended range searches for objects associated with traffic advisories. Alternatively, traffic detection and/or perception for collision avoidance can be otherwise directed within any suitable range(s), and/or S320 can be otherwise suitably executed.

In one variant, a detection range of an extended range search can be between 2 and 5 nautical miles (e.g., which may allow detection of aircraft which may otherwise remain undetected during real-time collision avoidance).

In one variant, extended range searches can be refined based on aircraft position data from an Automatic Dependent Surveillance-Broadcast (ADS-B).

Figure 18:
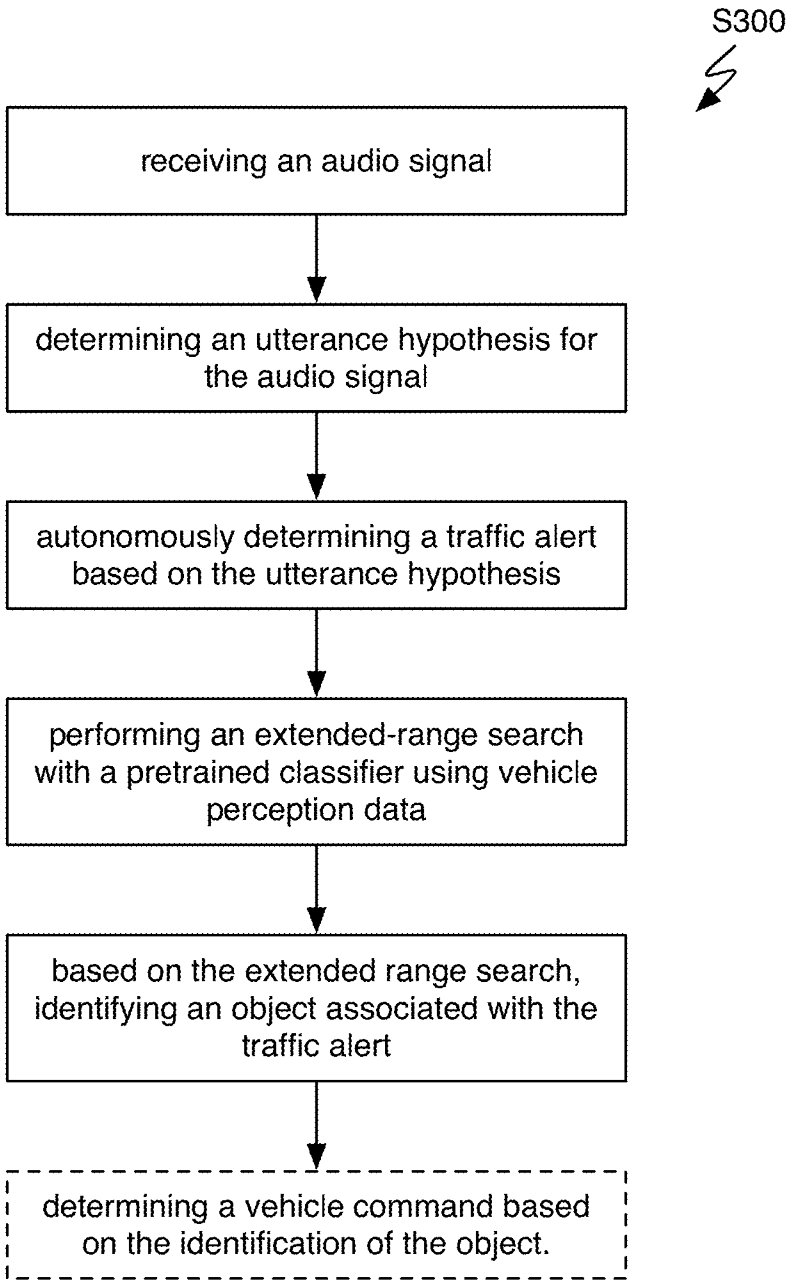
FIG. 18 is a diagrammatic flow chart representation of a variant of the method.

In variants, S320 can include identifying the object associated with a traffic advisory/alert based on a traffic detection routine (e.g., such as an extended-range search; an example is shown in FIG. 18). For example, the object can be identified based on a detection/classification probability exceeding a predetermined threshold and/or a location of the object falling within a threshold distance of an expected/estimated position of the object.

However, objects associated with a traffic advisory can be otherwise suitably located.

Performing an action based on the location of the object S330 functions to facilitate aircraft navigation and/or control based on the location of the object/aircraft. Additionally or alternatively, S330 preferably occurs in response to determining the location of the aircraft via S320, but can additionally or alternatively occur in response to pilot validation of the location and/or with any other suitable timing. Actions performed in S330 can include one or more of: determining a resolution advisory (e.g., via an autonomous engine onboard the aircraft, via a pilot interface, etc.), reporting negative contact (e.g., via an ATC radio), requesting updated ATC instructions (e.g., based on negative contact/failure to identify an object/aircraft; via an ATC request and NLP of the ATC response), confirming perception of the object/aircraft (e.g., providing a response to ATC, such as by generation of a semantic confirmation via the semantic parsing system 100), automatically determining an aircraft command (e.g., emergency plan; flight command based on a resolution advisory; flight command according to the current flight plan, such as in cases where the flightpath and/or flight plan remains unchanged and confirming the location of the object may allow the ego aircraft to proceed; etc.), controlling the aircraft, and/or any other suitable actions.

In one variant, performing the action includes controlling the aircraft based on the object. In one variant, performing the action includes reporting negative contact via an ATC radio (and/or requesting an updated ATC direction). In one variant, performing the action includes determining a resolution advisory and reporting the resolution advisory via the ATC radio.

In one variant, S330 can include: reporting negative contact (e.g., traffic not in sight; failure to identify proximal aircraft; reported to ATC and/or pilot) based on an extended-range search failing to identify an object associated with a traffic advisory (and/or traffic alert).

However, any other suitable actions can be performed.

S330 is preferably executed by the collision avoidance system (and/or an avoidance module thereof), but can additionally or alternatively or alternatively be executed by an autonomous computing system, the computing system(s) as described in U.S. application Ser. No. 17/891,845, filed 19 Aug. 2022, which is incorporated herein in its entirety by this reference, and/or any other suitable system(s) modules.

In some variants, S300 can optionally include cross-validating identification and/or localization of an aircraft based on real-time data. In one variant, the method can optionally include providing a follow-up request for an aircraft class, such as: "Say type of aircraft", and cross-validating the aircraft location based on semantic analysis of a radio response (e.g., such as by a subsequent iteration of S200). As an illustrative example, a common form of misidentification may occur when an aircraft pilot mistakes a large plane (e.g., which may be easy to see) for a small plane (e.g., which might be harder to see). Cross-validation may avoid misidentifications and/or improve accuracy/confidence of object identification/classification (and localization associated therewith). As a second example, a location can be cross-validated against an auxiliary data source [s] (e.g., ground radar) and/or via a pilot validation interface (e.g., where a pilot may also confirm a visual on the aircraft). However, traffic detections can be otherwise validated and/or verified, or may otherwise be acted upon entirely autonomously.

However, directed perception can include any other suitable elements, and/or can be otherwise suitably implemented in conjunction with the semantic parsing system and/or natural language processing.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUS, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for an aircraft, comprising:
a radio receiver;
a camera system onboard to the aircraft;
a flight management system of the aircraft; and
a processing system communicatively coupled to the radio receiver, the camera system, and the flight management system, wherein the processing system comprises a pretrained classifier and is configured to:
determine an estimated location of an object based on a signal from the radio receiver;
using a set of camera images collected by the camera system, determine a restricted image pixel search space within the set of camera images based on the estimated location of the object;
perform a search for the object with the pretrained classifier within the restricted image pixel search space; and
determine an action for the flight management system based on the extended range search.

2. The system of claim 1, wherein the action is a resolution advisory for the aircraft.

3. The system of claim 1, wherein the estimated location of the object is an ego-relative position of the object.

4. The system of claim 1, wherein the processing system is further configured to determine a refined location of the object based on an Automatic Dependent Surveillance-Broadcast (ADS-B).

5. The system of claim 1, further comprising a memory, wherein the set of camera images are historical camera images retrieved from the memory.

6. The system of claim 1, wherein the object is an airborne object.

7. The system of claim 1, wherein the traffic advisory is an utterance hypothesis determined using automatic speech recognition (ASR) on the signal from the radio receiver.

8. The system of claim 7, wherein the signal is an Air Traffic Control (ATC) signal.

9. The system of claim 7, wherein the processing system is further configured to determine the utterance hypothesis by:
generating a set of linguistic hypotheses;
using a language model, determining a respective language score for each linguistic hypothesis of the set of linguistic hypotheses; and
determining the utterance hypothesis from the set of the linguistic hypotheses based on the respective language scores.

10. The system of claim 1, wherein the traffic advisory is determined according to a sequence of natural language queries.

11. A system for an aircraft, comprising:

an imaging system; and a processing system onboard the aircraft and communicatively coupled to the imaging system, the processing system comprising an object detection model and configured to:

determine a restricted region within a set of measurements captured by the imaging system based on a traffic alert;

detect the object within the restricted space using an object detection model, wherein detecting the object comprises estimating a position of the detected object; and perform an action based on the position of the detected object.

12. The system of claim 11, wherein the traffic alert is determined from a human-interpretable audio signal received by the aircraft.

13. The system of claim 12, wherein the traffic alert is determined by querying the human-interpretable audio signal with a set of queries.

14. The system of claim 11, Wherein the processing system is further configured to refine the restricted space based on historical data.

15. The system of claim 11, wherein the traffic alert comprises a traffic advisory associated with a second aircraft.

16. The system of claim 11, wherein the traffic alert comprises a location estimate for the object.

17. The system of claim 16, further comprising an Automatic Dependent Surveillance-Broadcast (ADS-B) system onboard the aircraft, wherein the location estimate is from the ADS-B system).

18. The system of claim 11, wherein performing the action comprising transmitting the action to a flight control system for automatic implementation of the action.

19. The system of claim 11, wherein the imaging system comprises radar.

20. The system of claim 11, wherein the action comprises generating a negative contact report based on a failure to detect the object with the object detection model.

21. A system for an aircraft, comprising:

an imaging system; and a processing system onboard the aircraft and communicatively coupled to the imaging system, the processing system comprising an object detection model and configured to:

after the imaging system captures a set of measurements, determine a restricted region within the set of measurements based on a traffic alert;

detect the object within the restricted space using an object detection model, wherein detecting the object comprises estimating a position of the detected object; and perform an action based on the position of the detected object.

* * * * *